United States Patent [19]

Kwon et al.

[11] Patent Number: 4,945,502
[45] Date of Patent: Jul. 31, 1990

[54] DIGITAL IMAGE SHARPENING METHOD USING SVD BLOCK TRANSFORM

[75] Inventors: Heemin Kwon, Pittsford; Jeanine T. Liang, Rochester, both of N.Y.

[73] Assignee: Eastman Kodak Company, Rochester, N.Y.

[21] Appl. No.: 290,060

[22] Filed: Dec. 27, 1988

[51] Int. Cl.⁵ .................. G06F 15/332; H04N 1/40
[52] U.S. Cl. .................... 364/574; 358/166; 358/167; 382/51
[58] Field of Search ............ 358/80, 81, 82, 443, 358/452, 447, 448, 455, 463, 101, 166, 167, 282, 284; 364/518, 553, 554, 574, 725, 727; 455/305; 382/43, 51, 54

[56] References Cited

U.S. PATENT DOCUMENTS

| | | | |
|---|---|---|---|
| 4,055,756 | 10/1977 | Jolivet et al. | 364/727 X |
| 4,179,709 | 12/1979 | Workman | 358/133 |
| 4,242,705 | 12/1980 | Ebihara | 358/167 |
| 4,246,610 | 1/1981 | Takahashi | 358/167 |
| 4,442,454 | 4/1984 | Powell | 358/167 |
| 4,549,212 | 10/1985 | Bayer | 364/727 X |
| 4,553,165 | 12/1985 | Bayer | 364/727 X |
| 4,590,608 | 5/1986 | Chen et al. | 382/43 |
| 4,648,120 | 3/1987 | Chittineni | 382/27 X |
| 4,672,437 | 6/1987 | Casper | 358/106 X |
| 4,710,822 | 12/1987 | Matsunawa | 382/51 X |
| 4,817,180 | 3/1989 | Cho et al. | 382/54 |

Primary Examiner—Parshotam S. Lall
Assistant Examiner—Joseph L. Dixon
Attorney, Agent, or Firm—Edward Dugas

[57] ABSTRACT

A block transform image sharpening method employs singular value decomposition to boost texture and edge detail while not boosting shaded (uniform) areas of the image characterized by a lower signal-to-noise ratio while at the same time reducing noise in other areas of the same image not containing much edge detail or texture.

8 Claims, 11 Drawing Sheets

DIGITAL IMAGE SHARPENING METHOD USING SVD BLOCK TRANSFORM

RELATED APPLICATIONS

This application contains subject matter related to PCT Patent Application Ser. No. US88/00519 entitled "DIGITAL IMAGE NOISE SUPPRESSION METHOD USING SVD BLOCK TRASNFORM" filed Feb. 22, 1988.

TECHNICAL FIELD OF THE INVENTION

The invention relates to block transform digital image processing methods for increasing the sharpness of a digital image.

BACKGROUND OF THE INVENTION

The invention includes a noise suppression algorithm and a sharpening algorithm. The sharpening algorithm of the present invention is closely related to the noise suppression algorithm of the invention, since the success of these algorithms depends upon their ability to separate image detail from noise. Uniformly blurring the image (as in the prior art) achieves noise suppression, but unfortunately it also blurs image detail. Simple unsharp masking (as in the prior art) sharpens image detail but it also boosts noise. Hence, one goal of the invention is to distinguish image detail from noise while intelligently controlling the image components so as to perform both noise suppression and sharpening in the same image. The goal of the noise suppression algorithm of the invention is to suppress noise while leaving image detail untouched. The goal of the sharpening algorithm of the invention is to sharpen the image detail without boosting the noise.

In the present invention, the method used for noise suppression to discriminate image detail from noise is also employed to do the image sharpening, with appropriate modifications. A singular value decomposition (SVD) block transformation method has been shown in the related application referenced above to discriminate between image detail and noise, and is consequently used in the present invention to perform noise suppression. The same SVD noise suppression algorithm is employed in the invention with appropriate modifications to sharpen the image as well. For image sharpening, the invention does not need to work with the large block sizes disclosed in the related application. It is sufficient to use smaller block sizes (5×5 or 7×7 kernels).

Another embodiment of the invention includes the application of a non-linear gain function which will be described in detail later.

SUMMARY OF THE INVENTION

The present invention is a block transform image sharpening process. In arriving at the present invention, we found it helpful to consider the statistical properties of the noise being removed from an image, and the statistical properties of the image details such as texture and edges that were to be preserved in the processed image. In particular, we examined the statistical properties of the noise, and image detail in the transformed coordinate space. For a spatial transformation of the Walsh-Hadamard type, a transform coefficient of the noise is characterized by a Gaussian-like distribution around a mean value of zero. This is shown by Curve 10 in FIG. 2. The transform coefficients of the picture detail, including edges and texture, form a Lapacian-like distribution, also centered about zero (shown by Curve 12 in FIG. 2.)

The transform coefficients from the picture detail have generally higher amplitude in absolute terms than the ones from the noise. Noise suppression is achieved by thresholding the transform coefficients or by modifying them through a non-linear gain function. This will remove most of the noise but unfortunately it will remove the low amplitude transform coefficients from the image detail which will create artifacts. The artifacts are most noticeable and objectionable in low contrast fine textured area.

We also examined the variance distributions of the image components such as noise, texture, and edges, and noted that there was a much better separation of the statistics of the image components when plotted against variance of small regions. FIG. 3 is a graph showing variance plotted against distribution (number of occurrences) for film grain noise (Curve 14), texture (Curve 16), and edge detail (Curve 18) for a typical digital image produced by scanning a photograph.

It will be appreciated from a comparison of FIG. 2 with FIG. 3, that a noise reduction technique that discriminates based upon the variances of image detail will have a much better chance of reducing noise without affecting texture extensively. We also came to realize that there exists an image transformation called singular value decomposition (SVD) that decomposes an image into a set of singular vectors and singular values that are closely analogous to the concept of principal component analysis in statistics. This can be appreciated from the following analysis:

If an mxn matrix is treated as a set of n m-dimensional column vectors and the mean column vector is set to zero by subtracting it from every column vector of the matrix, then the singular values of the resulting matrix are the resulting matrix are the square roots of the variances of the m vector components in a rotated space. The rotated space is such that there is no correlation between any two components of the sample vectors in the rotated space. The distribution of the singular values for noise is a slowly decreasing function when they are ordered in decreasing order. The distribution of the singular values for the picture detail will be quite different from the noise. Also, the singular values for the picture detail will be much higher than those of the noise. And as mentioned above, discrimination of the noise from the picture detail will be much better.

According to the method of the present invention, a digital image is processed in a computer to increase sharpness by performing the following steps. First a non-linear gain function is produced, based upon the measured statistics of the singular values of the noise in the image. A detail image, and a low pass filtered image are produced from the digital image to be processed. The detail image is divided into blocks and the blocks are transformed into singular vectors and a diagonal array of singular values. The non-linear gain function is applied to the singular values to produce an array of singular values which have been modified so as to boost those regions of the detail image containing "edges" and characterized by a higher signal-to-noise ratio than other regions. An inverse SVD transform is performed on the singular vectors and the modified singular values to produce blocks of processed detail image values.

Finally, the processed detail image is added to the low pass image to generate a sharpened image.

BRIEF DESCRIPTION OF THE DRAWINGS

FIGS. 10a–10c are diagrams showing the values of the coefficients employed in the digital filter shown in FIG. 9;

MODES OF CARRYING OUT THE INVENTION

A portion of the disclosure of this patent document contains computer programs to which a claim of copyright protection is made. The copyright owner has no objection to the facsimile reproduction by anyone of the patent document or the patent disclosure as it appears in the Patent and Trademark Office patent file or records, but reserves all other rights whatsoever.

The digital image signal referred to in the following description is generated by scanning and sampling an original image. For purposes of describing the preferred embodiments, the input signal is generated from a photographic negative or transparency. The digital image signal represents a variety of spatial components of the image, including an average brightness level, fine detail such as lines and textures, intermediate detail such as small features, and coarse details such as shading on smooth surfaces and other gradually varying features. In addition, the signal includes a noise component affecting most of the spatial components of the image to some degree.

With a photographic negative or transparency, much of the noise is film grain noise. While the invention will be described in connection with sampled data from a photograph, it should be understood that the input signal can represent other information or data such as would be derived from directly scanning an object, from a composite video signal or from image information stored in optical or magnetic storage media. In such cases, the noise may originate in other characteristics of the image signal generating system. Since the singular values mentioned above measure correlations, the method of the invention can discriminate noise originating from a wide variety of noise sources so as to selectively sharpen "edge" features in the image while avoiding any "sharpening" of noise.

Figure 1:
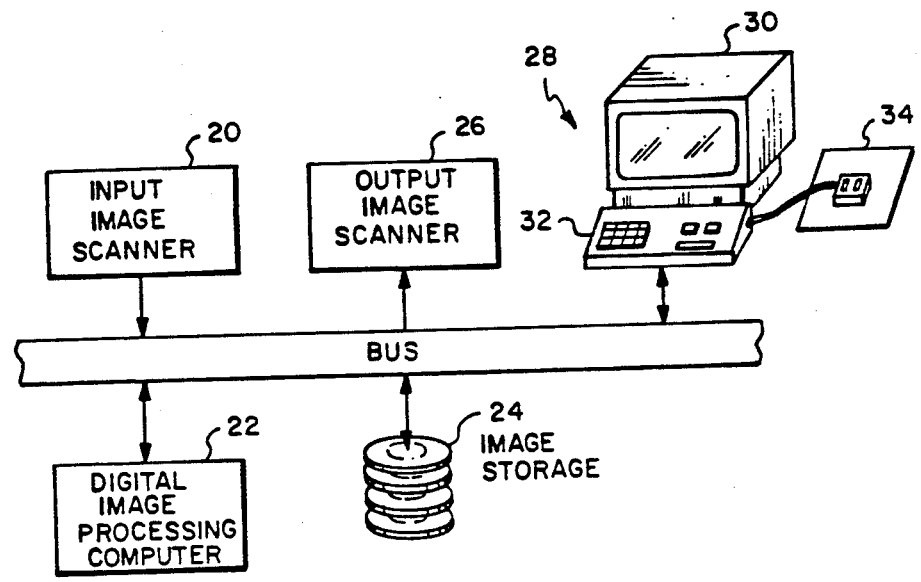
FIG. 1 is a schematic diagram showing a digital image processing system suitable for practicing the method of the present invention.

FIG. 1 is a schematic diagram showing a digital image processing facility useful for practicing the present invention. The digital image processing facility includes an input image scanner 20, such as a CCD scanner or a graphic arts flat bed or drum scanner. A digital image signal generated by an input scanner 20 is processed by the digital image processing computer 22. The digital image processing computer 22 can be a general purpose digital computer, or a special purpose computer specifically designed for processing images (e.g., a parallel multi-processor computer with 16 micro-processors and local memory). The original digital image from the scanner, and/or the processed digital image may be stored in a mass image storage memory 24, comprising for example magnetic or optical disk storage media.

The original and/or processed image may be displayed by means of an output image scanner 26, such as a CRT or laser film scanner. The system is controlled by an operator from a work station 28 such as the Sun work station manufactured and sold by Sun Microsystems Inc. The work station includes a CRT 30 for temporarily displaying an image, a keyboard 32, and graphics input device such as a mouse and graphics tablet 34.

Figure 4:
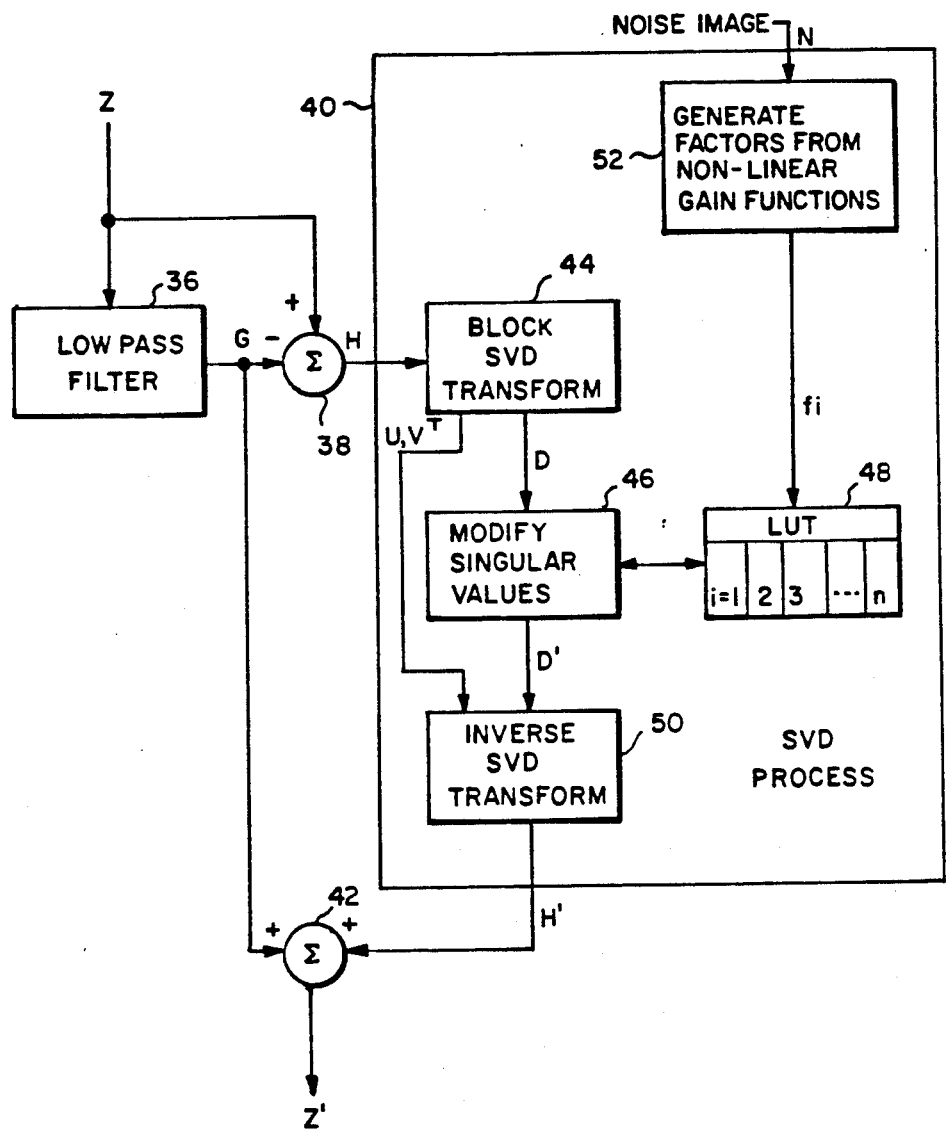
FIG. 4 is a block diagram illustrating the method of digital image processing according to the present invention.

FIG. 4 is a block diagram showing the major steps implemented by the image processing computer 22 in carrying out one mode of digital image processing according to the present invention. A low pass digital filter (e.g. a 11×11 pixel Gaussian Filter) is applied (36) to the digital image signal Z to produce a low pass digital image signal G. The low pass digital image signal G is subtracted (38) from the suitably delayed digital image signal Z to produce a detail image signal H. The detail image signal H is processed, employing SVD transformation (40), as described in detail below to produce a selectively sharpened detail signal H'.

In the SVD process the detail image signal H is block SVD transformed (44), employing the wall known SVD computer program listed in Appendix F attached hereto and described on pages 229 to 235 of the book: Computer Methods for Mathematical Computations by G. E. Forsythe, M. A. Malcolm, and C. B. Moler published by Prentice-Hall Inc., Englewood Cliffs, N.J., 1977, to produce singular vector matrices U, $V^T$, and a diagonal matrix D of singular values $d_i$ arranged in order of descending amplitude where:

$$H = UDV^T \tag{1}$$

where:

H is an nxn sub block (e.g. 5×5 pixels) of the image,
U contains the eigenvectors of $HH^T$,
D is a diagonal matrix which contains singular values $d_1\ d_2\ \ldots\ d_n$ in order of descending amplitude, and
V contains the eigenvectors of $H^TH$.

The singular values in the diagonal matrix (array) D are modified in a non-linear fashion (46) by respective individual factors $f_i$ stored in look-up table (LUT) 48 to produce an array D' of modified singular values. The generation of the factors stored in the look-up table 48 will be described in more detail below. The array of modified singular values D' and singular vectors $U, V^T$ are inversely transformed (50) to produce a selectively boosted detail signal H' which is then added to the low-pass filtered image G to produce a sharpened image Z'. It is the generation of the factors $f_i$ which is the key to selectively boosting just those regions of the detail image containing edges or characterized by a higher signal-to-noise ratio than the other regions of the detail image.

The generation of the factors $f_i$ from a non-linear gain function (52 in FIG. 4) will now be described with reference to FIG. 5. A digital noise image N generated for example by scanning a uniformly exposed and developed film is low pass filtered (54) for example by a 11×11 pixel Gaussian digital filter, to produce a low pass filtered noise image L.

The low pass filtered noise image L is subtracted (56) from the suitably delayed noise image N to produce a noise detail image signal. The noise detail image signal is block SVD transformed (58) to produce singular vectors and arrays of singular values $d_i$ for the noise image blocks. The singular values $d_i$ from each block of the transformed noise detail image are accumulated and the means $\mu_i$ and standard deviations $\sigma_i$ of the singular values in the respective positions of the array are calculated (60) as follows:

$$\mu_i = \frac{1}{n} \sum_{j=1}^{n} d_{i,j}, \quad (2)$$

$$\sigma_i = \frac{1}{n} \sum_{j=1}^{n} (d_{i,j} - \mu_i)^2 \quad (3)$$

where i is an index for the order of singular values, and j is an index for different blocks.

A factor $f_i$ for each singular value $d_i$ is then generated (62) by considering the following facts. The singular values of the noise will be centered at $\mu_i$ with standard deviation $\sigma_i$. The singular values of the shading areas of the image (where little or no sharpening is desired) will have slightly higher values than those of the areas dominated by noise. The singular values of the textured areas of the image (where some sharpening is desired) will have even higher values depending on the texture. The singular values of the edges in the image (where the greatest sharpening is desired) will have much higher values than those of the noise.

Considering the above, each singular value $d_i$, is multiplied by a factor $f_i$ through a non-linear function $F(d_i, \mu_i, \sigma_i)$ defined as below to produce the output singular value $d'_i$.

$$d'_i = f_i \cdot d_i,$$

where $$f_i = F(d_i, \mu_i, \sigma_i).$$

$$F(d_i, \mu_i, \sigma_i) = f_{min} + \quad (4)$$

$$(f_{max} - f_{min}) \cdot \left(1 - \exp\left[-a \cdot \left(\frac{d_i - \mu_i - thl \cdot \sigma_i}{\sigma_i}\right)^p\right]\right),$$

-continued if $d_i > (\mu_i + thl \cdot \sigma_i)$;
$= f_{min}$, if $d_i \leq (\mu_i + thl \cdot \sigma_i)$.

$f_{max}$ is a constant chosen for image sharpening and has a value (for example) in the range of one to three. $f_{min}$ is a constant chosen for the desired noise discrimination, which has a value between zero and one. The parameters a, p, and th1 are determined such that a good noise discrimination in the shading and textured area is achieved. The parameter th1 controls a threshold level. The parameters a and p control the transition between $f_{max}$ and $f_{min}$.

For noise suppression, one would have $f_{min}=0$ and $f_{max}=1$. For sharpening, $f_{min}=1$ and $f_{max}=3$, a choice which leaves noise as it is while boosting the image detail. By combining both features, for example selecting $f_{min}=0$ and $f_{max}=3$, one achieves sharpening with noise suppression. The noise suppression is not as good as that achieved using larger sized blocks or kernels (as disclosed in the above-referenced related application) but it does provide a second advantage in an algorithm which performs both noise suppression and sharpening simultaneously in the same image.

Figure 6:
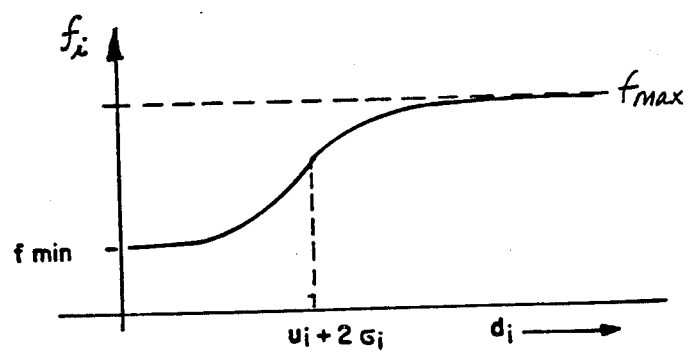
FIG. 6 is a graph showing the values of a typical table of factors generated according to the steps shown in FIG. 5.
Figure 2:
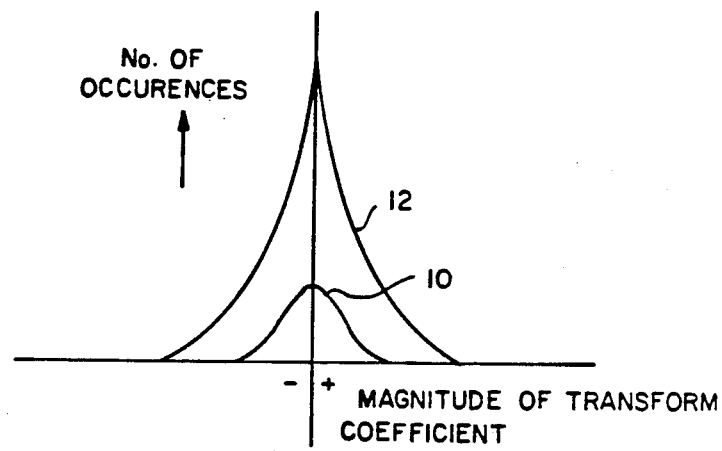
FIG. 2 is a graph useful in describing the statistics of image features processed according to the prior art.
Figure 3:
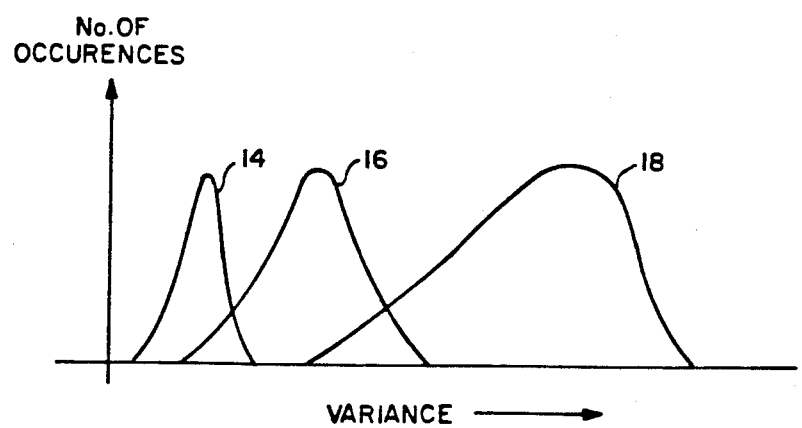
FIG. 3 is a graph useful in describing the statistical features of an image processed according to the present invention.

The formula mentioned above is only one form of many possible formulas that can be used as a factor for sharpening. From equation 4, the resulting behavior of $f_i$ as a function of $d_i$ is illustrated as a curve in FIG. 6. The effect is to threshold the noise, reduce the singular values for shading area, and boost those singular values corresponding to texture and edges. The selection of thresholding level and curve shape depends on the artifacts one might tolerate.

The values $f_i$ of the non-linear gain functions $F(d_i, \mu_i, \sigma_i)$ are calculated for each singular value $d_i$ to produce a table of factors $f_i$ for each singular value. The factors $f_i$ are digitized in the form of look up tables and stored in look up table 48 shown in FIG. 4.

Figure 5:
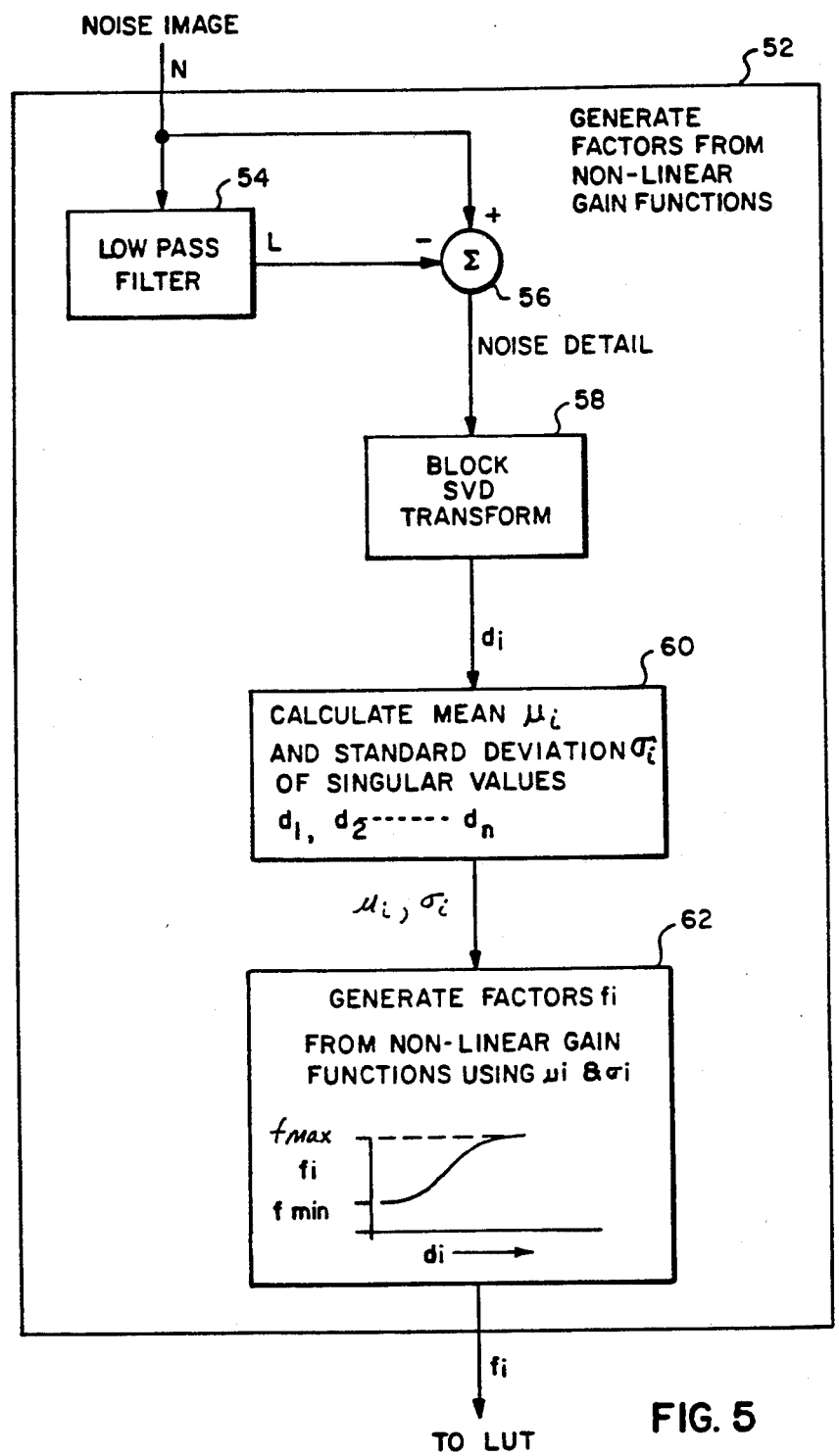
FIG. 5 is a block diagram illustrating the step of generating the table of factors described in FIG. 4.

A Fortran program for implementing, in a general purpose digital computer, the basic SVD digital image processing method described with reference to FIGS. 4 and 5 is listed in List 1 with reference to the attached appendices.

LIST 1

This is a basic version of the method which is described in FIGS. 4 and 5.

| | | |
|---|---|---|
| 1. Get a low Pass filter | filter.for | APPENDIX A |
| 2. Convolve with a filter | convol.for | APPENDIX B |
| 3. Get a band-passed image | imgn.for | APPENDIX C |
| 4. Get SVD noise data | svdnoi.for | APPENDIX D |
| 5. Basic version of SVD | svd_basic.for | APPENDIX E |
| 6. Subroutines for above programs | svd_util.for | APPENDIX F |

Figure 7:
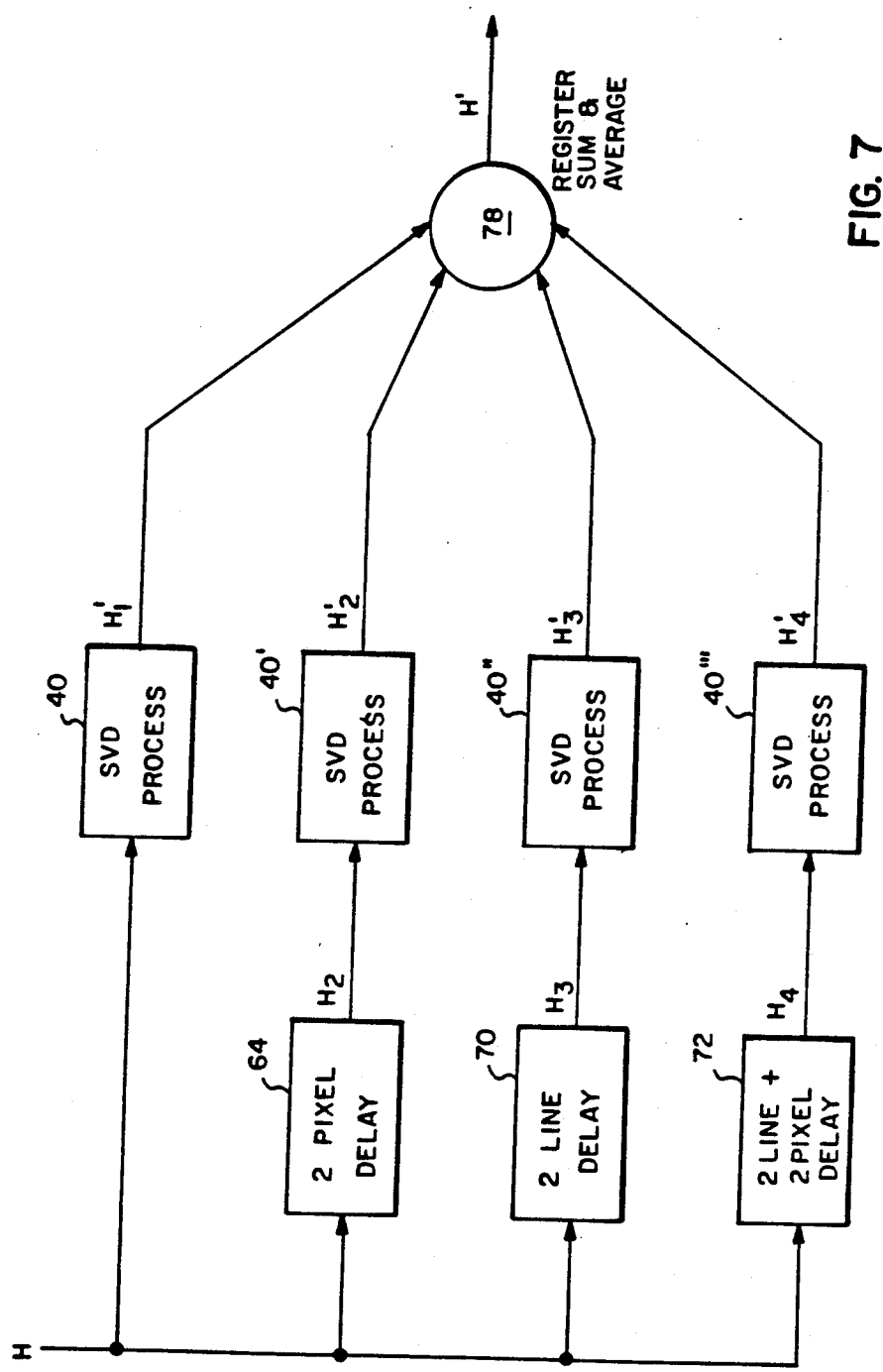
FIG. 7 is a block diagram showing a block overlap method of processing a digital image according to the present invention.

According to the presently preferred mode of practicing the invention, the block SVD processing is performed using a moving average technique employing block overlap to reduce the appearance of blocking artifacts. FIG. 7 is a schematic block diagram showing the major steps involved in the block overlap SVD processing.

Figure 8:
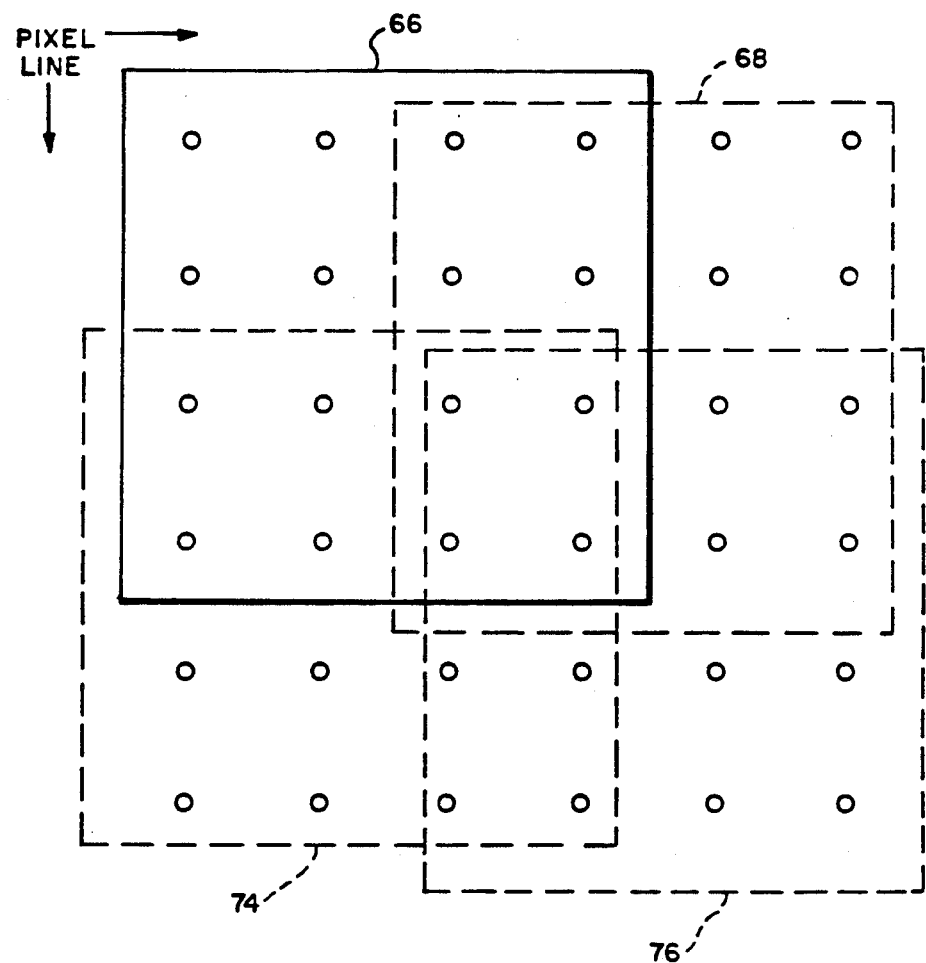
FIG. 8 is a diagram useful for describing the image processing method shown in FIG. 7.

For the purpose of simplifying the description, processing incorporating a 4×4 pixel block, with a 2 pixel step in the horizontal and vertical directions will be described. Such a block overlap pattern is shown in FIG. 8. In the actual practice, a 5×5 pixel block is employed with 1 or more pixel steps, depending on the tolerance of the blocking artifacts. Referring to FIG. 7, an image detail signal H, generated as shown in FIG. 4, is processed by a block SVD process 40 (as shown in FIG. 4) to produce a processed image detail signal $H_1'$. Simultaneously, the image detail signal H is delayed by 2 pixels (64) and block SVD processed 40' to produce a processed image detail signal $H_2'$. The 2 pixel delay has the effect of shifting the blocks that are processed by 2 pixels, as shown by the blocks of pixels labeled 66 and 68 in FIG. 8. The image detail signal is similarly delayed by 2 lines (70), and 2 lines plus 2 pixels (72) and block SVD processed (40") and (40 "') to produce processed image detail signals $H_3'$ and $H_4'$ respectively. The 2 line and 2 line plus 2 pixel delays have the effect of shifting the blocks as shown by the blocks of pixels labelled (74) and (76) respectively in FIG. 8. The processed detail signals $H_1'$, $H_2'$, $H_3'$ and $H_4'$ are registered, summed, and averaged (78) to produce the processed image detail signal H'. The processed image detail signal H' is added to the low pass filtered image signal G to produce the processed image signal Z' as shown in FIG. 4. It will be readily apparent that the processing method may be extended to larger blocks with different amounts of block overlap. A moving average SVD Fortran program for implementing the processing method described with reference to FIG. 7 in a general purpose digital computer, is listed in List 2 with reference to the attached appendices.

LIST 2

This version of the method includes the block moving average described in FIG. 7.

| 1. SVD with moving average | svd_move.for | APPENDIX G |
| 2. Subroutines | svd_util.for | APPENDIX F |

Multistage processing is not necessary, although on a more complicated scheme one might want to boost different frequency bands differently. A processed image with only a single stage (as shown in FIG. 4) shows good results for most applications.

Figure 9:
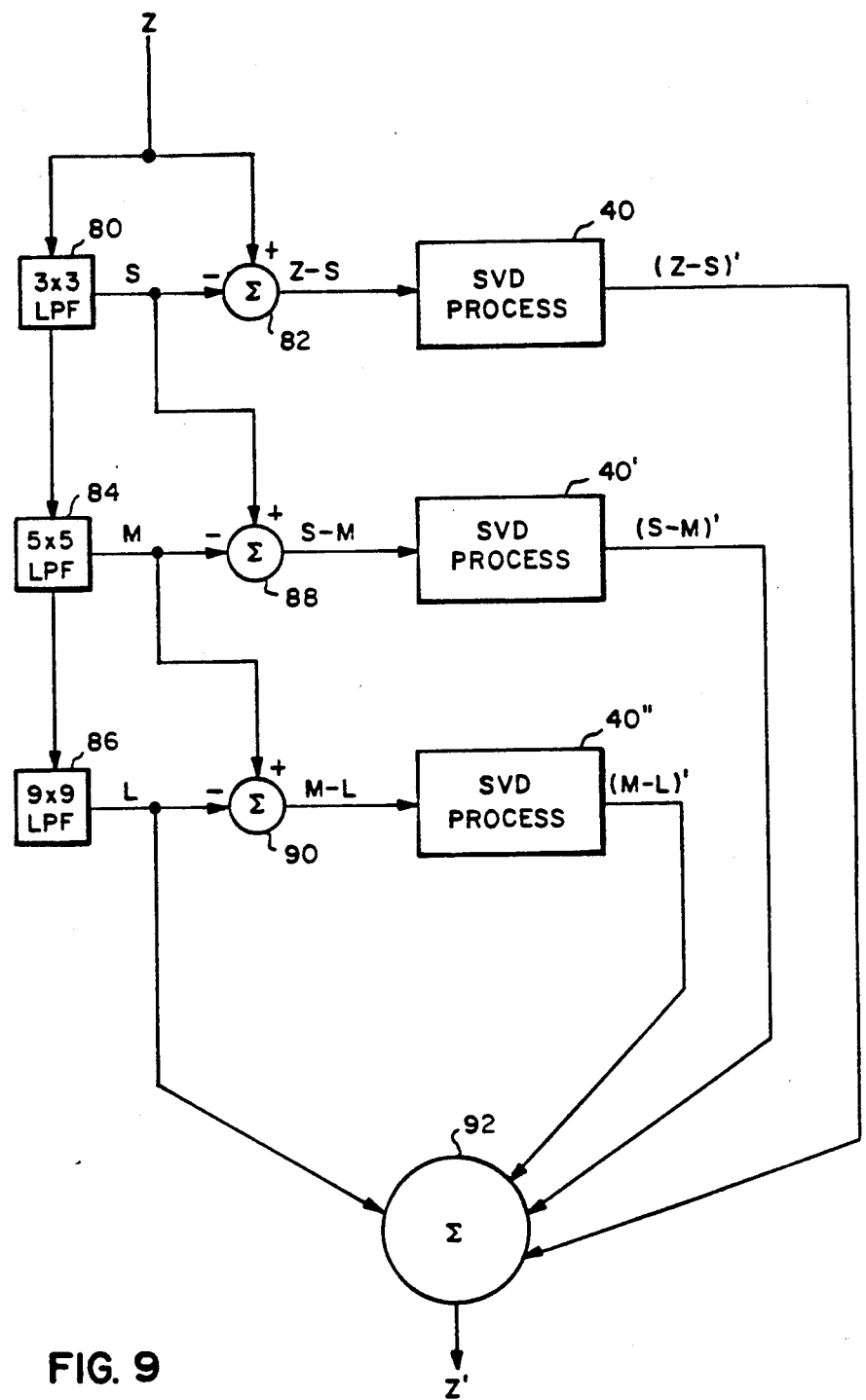
FIG. 9 is a block diagram showing a digital image processing method according to the present image processing method according to the present invention.

The SVD processing method according to the present invention can be extended to a processing method of the type disclosed in U.S. Pat. No. 4,442,454 issued Apr. 10, 1984 to Powell, wherein the processing employs a detail signal representing a pass band of spatial frequencies. The processed digital image signal is obtained, whereby noise from certain spatial frequency content is effectively removed from the image. As shown in FIG. 9 an input digital image Z is filtered through a 3×3 pixel low pass filter 80 to obtain the low pass filtered image S. S is subtracted from Z (82) to obtain the difference image Z-S which is a bandpass filtered version of image Z. The difference image signal Z-S is a bandpass version of the original image Z. The bandpass image is processed by the SVD process 40 to determine the amount of image sharpening in each area of the image before being combined (92) with the low pass filtered image L to produce the sharpened Z'. The low pass filter coefficients used to produce the digital filters 80, 84 and 86 are shown in FIG. 10.

A Fortran program for implementing the multi-stage SVD digital image processing method described with reference to FIG. 9 in a general purpose digital computer, is listed in List 3 with reference to the attached appendices.

LIST 3

Figures 10A, 10B, 10C:
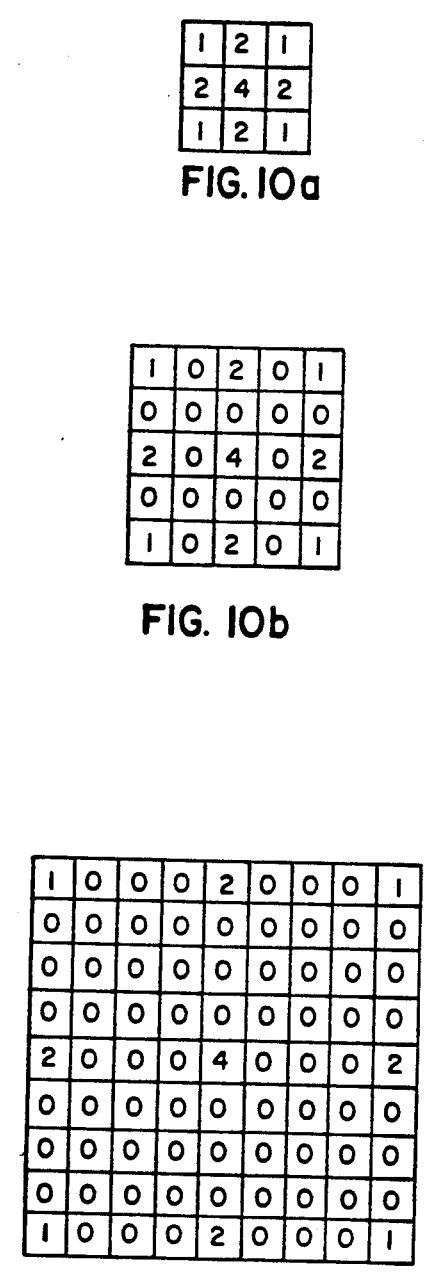

The basic SVD method applied to the multi-stage processing method described in FIGS. 9 and 10.

| 1. Get the low pass filter | sml_filter.for | APPENDIX H |
| 2. Convolve with a filter | convol.for | APPENDIX B |
| 3. Get a band-passed image | imgn.for | APPENDIX C |
| 4. Get SVD noise data | svdnoi.for | APPENDIX D |
| 5. SVD with moving average | basic.version of.svd_for | APPENDIX E |
| 6. Subroutines for above programs | svd_util.for | APPENDIX F |

Figure 11:
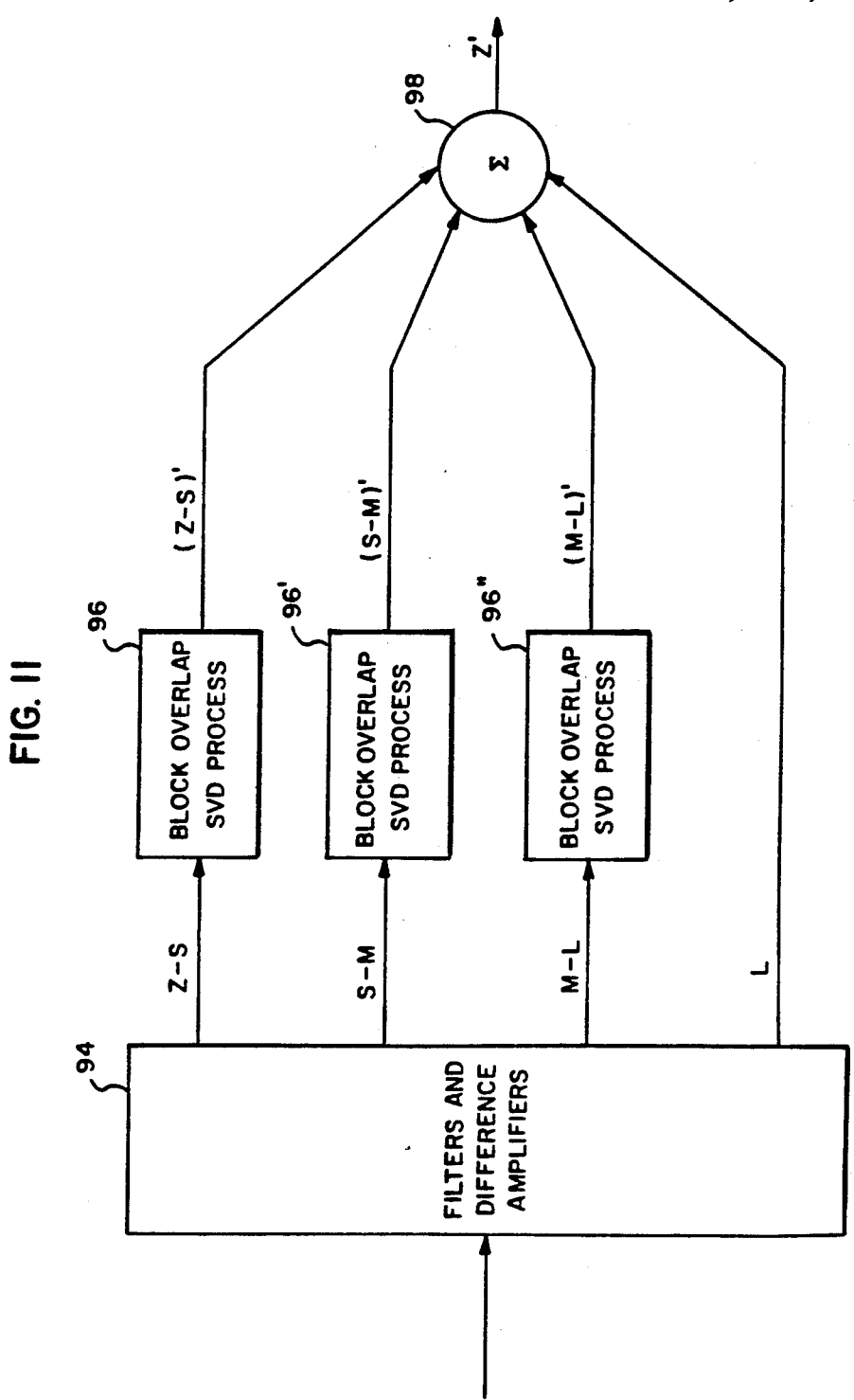
FIG. 11 is a diagram showing a digital image processing method according to the present invention employing block overlap and a spatial frequency band pass image signal.

The moving average technique can be employed with the multi-stage method described with reference to FIG. 9 as follows. Instead of processing the Z-S image through SVD process 40, the bandpass image can be processed through the block-overlap SVD processing as described above with reference to FIGS. 7 and 8. The flow chart of this combined processing is shown in FIG. 11. Referring to FIG. 11, a filter and difference amplifier 94 is employed to generate the bandpass image Z-S and a low pass image L from image Z as was described in FIG. 9. A block-overlap SVD process 96, as shown in FIG. 11, is applied to the bandpass signal Z-S to produce a processed bandpass image (Z-S)'. The processed bandpass image is summed (98) with low pass image L to produce processed image Z'.

A Fortran program for implementing the multi-stage, moving average SVD digital image processing method described with reference to FIG. 11, in a general purpose digital computer, is listed in List 4 with reference to the attached appendices.

LIST 4

This SVD method with the block moving average apply to multi-stage processing method described in FIG. 11.

| 1. Get the low pass filters (s, m, and l) | sml_filter.for | APPENDIX H |
| 2. Convolve with a filter | convol.for | APPENDIX B |
| 3. Get a band-passed image | imgn.for | APPENDIX C |
| 4. Get SVD noise data | svdnoi.for | APPENDIX D |
| 5. SVD with moving average | svd_move.for | APPENDIX G |
| 6. Subroutines for above programs | svd_util.for | APPENDIX F |

Figure 12:
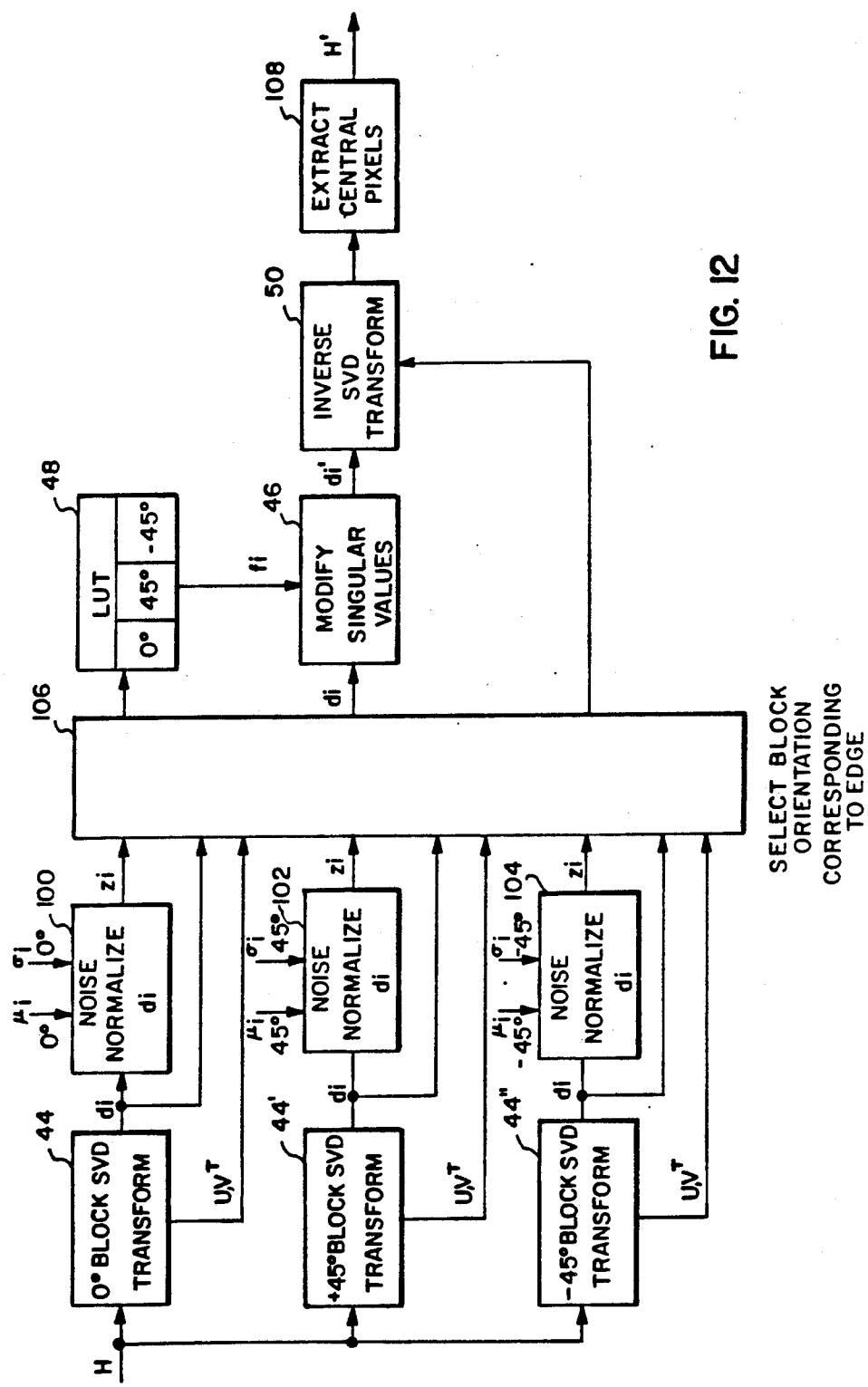
FIG. 12 is a diagram showing a mode of practicing the invention including means for processing diagonal edge information.
Figure 13:
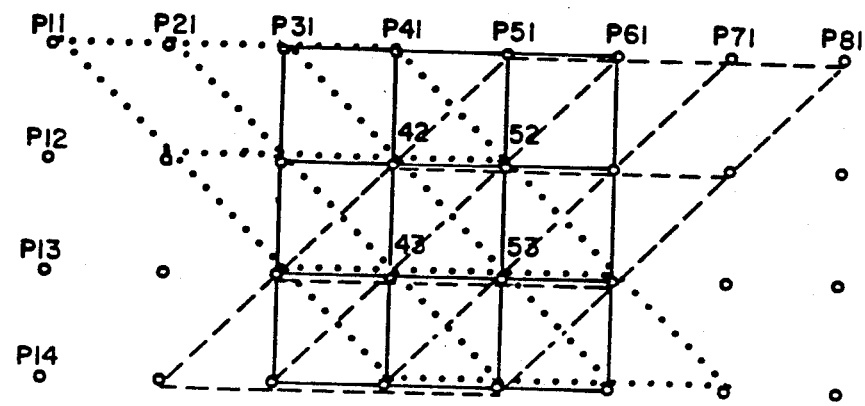
FIG. 13 is a diagram useful in describing the operation of the digital image processing method shown in FIG. 12.

To improve the response to diagonal edges having ±45° orientation, the image blocks are sampled in a trapezoidal pattern as shown in FIG. 13. In this figure, we show by example how (for example) a 4×4 block of pixels $P_{n,m}$ can be sampled in three different grid orientations, −45° (shown by dotted lines), 0° (shown by solid lines), and +45 degrees (shown by dashed lines). Note that the three differently oriented sampling patterns have a sub-block of 4 common pixels ($P_{4,2}P_{5,2}P_{4,3}$ and $P_{5,3}$) in the center. As shown in FIG. 12, the SVD transform is performed on each of the three blocks of different orientations. The image detail signal H, generated as shown in FIG. 4, is processed by a 0° block SVD transform 44, +45° block SVD transform 44', and a −45° block SVD transform 44", to produce sets of singular vector matrices U and $V^T$ and singular values $d_i$.

The singular values $d_i$ are noise normalized (100, 102, 104) according to:

$$z_i = (d_i - \mu_i)/\sigma_i \tag{5}$$

where i=1, 2, ... n; and $\mu_i$ and $\sigma_i$ are the mean and standard deviations, respectively of the noise singular values $d_i$, generated for each block orientation (0°, 45°, and −45°) as described previously with reference to FIG. 5. The block orientation most closely corresponding to the orientation of an edge is selected (106) on the basis of the values of the noise normalized singular value $z_i$. Generally, if the orientation of the SVD blocks transform corresponds to the orientation of an edge in the image, its noise normalized singular values $z_i$ decrease faster as the index i increases, and the first few values $z_1$ and $z_2$ are higher than those of blocks not oriented with an edge.

The selection is performed as follows. Starting from i=1, $z_i$ from each block is compared with the noise level say $3.5\sigma_i$ for the block orientation. The lowest index i where the normalized singular value falls within the noise level is noted and denoted $i_n$. If $i_n$ for all 3 block orientations (i.e., 0°, 45° and −45°) are each different, the block orientation with the lowest $i_n$ is selected. If the lowest $i_n$ is the same for two orientations, then the orientation with the largest value of $(z_1+z_2)$ is selected. If $i_n$ is identical for all three orientations, and $i_n$ is 1, then the region is most likely dominated by noise, and the 0° orientation is selected. If $i_n$ is the same for all three orientations and $i_n$ is equal to 2, then the orientation with the largest value of $z_1$ is selected. If $i_n$ is the same for all three orientations and $i_n$ is greater than 2, then an orientation with the largest $(z_1+z_2)$ is selected.

An orientation chosen in this way provides the best representation of the local image detail. A look up table 48 of factors $f_i$ for modifying the singular values is prepared as was described with reference to FIG. 5 for each block orientation. The appropriate factors $f_i$ are applied (46) to the singular values $d_i$ from the block having the selected orientation to produce modified singular values $d_i'$. The modified singular values $d_i'$ and singular vector matrices U and $V^T$ are inverse transformed (50) to produce a sharpened image detail signal. The 4 pixels ($P_{4,2} P_{5,2} P_{4,3}$ and $P_{5,3}$) common to all three block orientations are extracted from each processed block to produce the sharpened image detail signal H'. Finally, the sharpened image detail signal H' is added back to the low pass image signal G to form the processed image signal Z' as shown in FIG. 4. Although the diagonal block SVD processing method was described with reference to 4×4 block of pixels for ease of description, the presently preferred block size is 5×5 pixels.

The diagonal block SVD processing method is preferably implemented using the multi-stage block overlap technique described with reference to FIG. 11, and the center common block portion of 4 pixels is extracted from the SVD processed block of that orientation.

A Fortran program for implementing in a general purpose digital computer, the diagonal block SVD processing method described with reference to FIG. 12 is listed in List 5 with reference to the attached appendices.

LIST 5

This version of the method includes the block moving average and 3-orientation described in FIG. 12.

| | | |
|---|---|---|
| 1. Get the low pass filter | filter.for | APPENDIX A |
| 2. Convolve with a filter | convol.for | APPENDIX B |
| 3. Get a band-passed image | imgn.for | APPENDIX C |
| 4. Get SVD noise data | svdnoi.for | APPENDIX D |
| 5. SVD with moving average and 3-orientations | svd_move_3ori.for | APPENDIX I |
| 6. Subroutines for above programs | svd_util.for | APPENDIX F |

The method of the present invention can be applied to processing digital color images in a variety of ways. In one mode, the digital color image is separated into red, green, and blue color separation images, and each color separation image is processed using a block SVD transform method as described above. In the preferred mode of practicing the invention with a color image, the red, green, and blue color image is transformed into a luminance Y (e.g. Y=⅜ R+4/8 G+⅛ B) and two color difference components (R-Y and B-Y). Each of these images is processed using any one of the SVD block transform methods described above to produce processed luminance and color difference signals. The processed luminance and color difference signals are recombined to produce the processed color image. In an alternative method, the red, green, blue color images are transformed into a luminance (Y), and two color difference components (R-Y and B-Y). Only the luminance image Y is processed using the block SVD transform method and the processed luminance image is recombined with the color difference components to produce a processed color image. This approach reduces the processing time compared with the method discussed immediately above.

Industrial Applicability and Advantages

The image processing method according to the present invention is useful in graphic arts digital image processing and photographic digital image processing. The method has the advantage of producing a sharpened image, having reduced noise, and free from undesirable artifacts in areas of texture. The method has the further advantage that image detail is not perceptibly degraded by the sharpening process.

Appendix A
Copyright 1988
Eastman Kodak Company

```
c       filter.for
c       generate filter(mask) file c       oct-26-87
c       link with svd_util.for character*32 text,fname,fname2
        dimension table(0:999)

data ir,iw/5,6/
        data iu,iu2/99,98/ write(iw,10)
10      format(/,' filter: generates filter file',/)

c       input
```

```
            text='filter file'
            call ascnam(ir,iw,text,fname)
            call blksiz(ir,iw,nbe,nbl)
            call smplxy(ir,iw,ixsmpl,iysmpl)

write(iw,32)
32          format(' mode options:'
     1,/,14x,'0:gauss'
     2,/,14x,'1:exp'
     3,/,14x,'2:uniform'
     4,/,14x,'3:user input'
     5,/,14x,'4:input from disk, ascii file'
     1,/,' mode, sigma_x, sigma_y')
            read(ir,*) mode,sigmax,sigmay
34          format(i,2f)

c           user input mask if(mode.eq.3) then
            write(iw,112)
112         format(' type line by line: max 10x10 by hand input')
            do 801 j=0,nbl-1
            write(iw,114) j
114         format(1x,i5,' th line ?')
            read(ir,*) (table(j*nbe+i),i=0,nbe-1)
116         format(10f)
801         continue
c           enddo   loop j else if(mode.eq.4) then
            call clrasc(32,text)
            text='user input disk file'
            call ascnam(ir,iw,text,fname2)
            open(unit=iu2,file=fname2,status='old')
            read(iu,*) nbe,nbl,ixsmpl,iysmpl
216         format(4i)
            do 802 j=0,nbl-1
            read(iu,*) (table(j*nbe+i),i=0,nbe-1)
218         format(10f)
802         continue
c           enddo   loop j else if(mode.eq.0.or.mode.eq.1.or.mode.eq.2) then xc=(nbe-1)/2.
            yc=(nbl-1)/2.

do 803 iy=0,nbl-1
            do 804 ix=0,nbe-1 x=float(ix)-xc
            y=float(iy)-yc c           gaussian,exponential,and uniform masks if(mode.eq.0) then
            table(iy*nbe+ix)=gauss(x,sigmax)*gauss(y,sigmay)
            else if(mode.eq.1) then
            table(iy*nbe+ix)=exp(-abs(x)/sigmax)*exp(-abs(y)/sigmay)
            else if(mode.eq.2) then
            table(iy*nbe+ix)=1.
            endif
c           mode 804         continue
c           enddo   loop ix
803         continue
c           enddo   loop iy endif
c           mode c           output
            open (unit=iu,file=fname,status='new')

write(iu,102) nbe,nbl,ixsmpl,iysmpl,sigmax,sigmay
102         format(1x,4i5,2e15.5)
            do 805 i=0,nbe*nbl-1
            write(iu,104) i,table(i)
```

```
104     format(1x,i5,e15.5)
805     continue
c       enddo close(iu)

end function gauss(x,sigma)

data pi/3.1415926535/ if(sigma.eq.0.) then
                if(x.eq.0.) then
                gauss=1.
                else if(x.ne.0.) then
                gauss=0.
                endif
        else if(sigma.ne.0.) then
                arg=(x**2)/(2.*(sigma**2))
                gauss=exp(-arg)/(sqrt(2.*pi)*sigma)
        endif return
        end c       convol.for
c       convolution of an image with a mask(filter)

c       oct-26-87
c       link with svd_util.for c       assumes picture is one layer character*1 com
        character*32 fname1,fmask,fname3
        character*32 text dimension bufi(0:99999)
        dimension bufo(0:1999)
        dimension work1(0:2100),work2(0:2100)
        dimension lp(0:59)
        dimension wt(0:899)

data ir,iw/5,6/
        data iu1,iu2,iu3/51,52,53/ c       ne: number of pixels per line (max:2000 pixels)
c       nl: number of lines of the image
c       nbe: # of elements per block   (block size in x)
c       nbl: # of lines per block (block size in y)

write(iw,10)
10      format(/,' convol: makes a convolution of an image',/)

call picsiz(ir,iw,'i',nc,ne,nl)
        call recsiz(ir,iw,ne,lform,lrec)
        call winsiz(ir,iw,ne,nl,ixl,ixh,iyl,iyh)
        call picnam(ir,iw,1,'i',fname1)
        call picopn(iu1,fname1,lrec,'old',' ')
c       input file seqeuntial text='convolution mask file' call ascopn(iu2,fmask,'old',' ')
c       readonly call picnam(ir,iw,1,'o',fname3)
        call picopn(iu3,fname3,lrec,'new',' ')

write(iw,52)
52      format(' normalization by sum of masks (y:d/n) ?')
        read(ir,54) com
54      format(a1)
```

Appendix B
Copyright 1988
Eastman Kodak Company

```
             read(iu2,*) nbe,nbl,ixsmpl,iysmpl,dum,dum
114          format(1x,4i5,2e15.5)
             do 801 j=0,nbl-1
                   do 802 i=0,nbe-1
                   k=j*nbe+i
                   read(iu2,116) iorder,wt(k)
                   write(iw,118) iorder,wt(k)
116          format(1x,i5,e15.5)
118          format(1x,i5,'th weight = ',e15.5)
802          continue
c            enddo   loop i
801          continue
c            enddo            loop j close(iu2)

sum=0.

do 803 k=0,nbe*nbl-1
             sum=sum+wt(k)
803          continue
c            enddo   loop k nbec=(nbe-1)*ixsmpl/2
c                  !center of nbe
             nblc=(nbl-1)*iysmpl/2
c                  !center of nbl
             msizx=ixsmpl*(nbe-1)+1
             msizy=iysmpl*(nbl-1)+1
             nbsizx=ixsmpl*nbe
             nbsizy=iysmpl*nbl write(iw,202) ix0,iy0,ixsmpl,iysmpl
            1,msizx,msizy,nbsizx,nbsizy
202             format(' main: ix0,iy0 = ',2i8
            1,/,' main: ixsmpl,iysmpl = ',2i8
            1,/,' main: support size = ',2i8
            1,/,' main: nbe*ixsmpl,nbl*iysmpl = ',2i8)

write(iw,*) 'ok ' c            let's take care of the border area here do 810 iy=1,jy0+nblc
c            do not bother to do (jy0+nblc-1) lines
             irec=iy
             read(iu1,rec=irec) (bufi(i),i=0,ne-1)
             write(iu3,rec=irec) (bufi(i),i=0,ne-1)
c            same one back
810          continue
c            enddo   loop iy lextra=0
             do 811 iys=0,iysmpl-1
             jy0=iy0+iys
             nytry=(nl-jy0-(nbl-1)*iysmpl)/iysmpl
c            number of loops in y direction ll=nl-nytry*iysmpl-jy0-nblc
c                   remaining extra lines
             if(ll.gt.lextra) lextra=ll
811          continue
c            enddo   loop iys c            write out remaining lines if(lextra.gt.0) then
                   line3=nl-lextra+1 c            starting line for lextra
                   do 812 iy=0,lextra-1
                   irec=line3+iy
                   read(iu1,rec=irec) (bufi(i),i=0,ne-1)
                   write(iu3,rec=irec) (bufi(i),i=0,ne-1)
812          continue
c                   enddo   loop iy
             endif
c            lextra
```

```
c       ok now run the engine do 820 iys=0,iysmpl-1
        jy0=iy0+iys
        jx0=ix0
        mseq=iys call engine(ir,iw,iu1,iu3,ne,nl,nbe,nbl,ixsmpl,iysmpl
       1,bufi,bufo,lp,work1,work2
       2,jx0,jy0,mseq,wt,nbsizx,nbsizy,nbec,nblc,lrec)

820     continue
c       enddo   loop iys c       normalize by the sum of weights if(com.eq.'n'.or.com.eq.'N') then
        write(iw,*) ' as you chose, the normalization was not done. '
        else
        denom=sum
        call dskdiv(iu3,iu3,lrec,bufi,ne,nl,denom)
        endif
c       !com close(iu1)
        close(iu3)

end c------------------------------------------------------------------ subroutine engine(ir,iw,iu1,iu3,ne,nl,nbe,nbl,ixsmpl,iysmpl
       1,bufi,bufo,lp,work1,work2
       2,jx0,jy0,mseq,wt,nbsizx,nbsizy,nbec,nblc,lrec)

dimension bufi(0:ne*nbl-1)
c       for nbl lines
        dimension bufo(0:ne-1)
c               output buffer
        dimension lp(0:nbl-1)
        dimension work1(0:ne+nbe-2)
        dimension work2(0:ne-1)
        dimension wt(0:nbe*nbl-1)

if(mseq.eq.0) then
        write(iw,802) nbe,nbl,ixsmpl,iysmpl
802     format(' engine: nbe,nbl,ixsmpl,iysmpl=',4i5)
        write(iw,804)
804     format(' weights:')
        do 901 k=0,nbe*nbl-1
        write(iw,806) k,wt(k)
806     format(1x,i5,e15.5)
901     continue
c       enddo   loop k endif nytry=(nl-jy0-(nbl-1)*iysmpl)/iysmpl
c       number of loops in y direction write(iw,800) jx0,jy0,nytry
800     format(/,' engine: jx0,jy0,nytry:',3i5)

call ptr0(nbl,lp)
c       initialize pointer lp(k)

c       initially read in nbl lines
        do 910 j=0,nbl-1
        linei=jy0+j*iysmpl+1
c               irec starts from 1
        read(iu1,rec=linei) (bufi(ne*lp(j)+i),i=0,ne-1)
910     continue
c       enddo   loop j linei=jy0+(nbl-1)*iysmpl+1
c               offset for input  line
        lineii=jy0+nblc+1
c       offset for output line
```

```
      do 911 iy=0,nytry-1 linei=line1+iy*iysmpl
c     !iysmpl
      if(iy.ne.0) then
      read(iu1,rec=linei) (bufi(ne*lp(nbl-1)+i),i=0,ne-1)
c                 always read into lp(nbl-1)
      endif
c     iy do 912 ixs=0,ixsmpl-1
      ixoff=jx0+ixs
      nxtry=(ne-jx0-ixs)/ixsmpl
c     number of data in x c-------beginning of convolution calculation call clr(nxtry+nbe-1,work1)
c     clear working area
      call clr(nxtry,work2)
c     temporaty place to hold sampled result nbec=(nbe-1)/2
      do 913 j=0,nbl-1
      call movxs(nxtry,ixsmpl,bufi(ne*lp(j)+ixoff),work1(nbec))

c     get data into the working area with offset nbec
            do 914 i=0,nbe-1
            k=j*nbe+i
            wtij=wt(k)
            call mulcy(nxtry,wtij,work1(i),work2)

c                 accumulate result in work2
914   continue
c           enddo    loop i call movxsi(nxtry,ixsmpl,work2,bufo(ixoff))
c           get sampled output from the convolution result 913   continue
c     enddo    loop j c-------end of convolution calculation 912   continue
c     enddo    loop ixs lineo=line11+iy*iysmpl
      write(iu3,rec=lineo) (bufo(i),i=0,ne-1)

call ptr(nbl,lp)
c     update pointer 911   continue
c     enddo    loop iy return
      end
```

Appendix C
Copyright 1988
Eastman Kodak
Company

```
c     imgn.for
c     arithmatic operations:(add/subtract,multiply,and divide)
c     in n image layers c     sep-2-87
c     link with iputil.for c     assumes picture is a one layer image.

character*1 com
      character*32 fname(0:9)

dimension buf(0:3999,0:9)
      dimension iu(0:9)
      dimension f(0:9)

data ir,iw/5,6/
      data iu0/50/
```

```
c       starting unit number c       ne: number of pixels per line
c       nl: number of lines of the image
c       n:  number of input files write(iw,10)
10      format(/,' imgn: arithmatic in n image layers',/)
        call picsiz(ir,iw,'i',nc,ne,nl)
        call recsiz(ir,iw,ne,lform,lrec)
        call winsiz(ir,iw,ne,nl,ixl,ixh,iyl,iyh)

write(iw,22)
22      format(' how many images as an input (max=9) ?')
        read(ir,*) n
24      format(i)

do 801 ifile=0,n
        iu(ifile)=iu0+ifile
801     continue
c       assign unit number call picnam(ir,iw,n,'i',fname(1))

c       read n input file names starting fname(1)

do 803 ifile=1,n
        call picopn(iu(ifile),fname(ifile),lrec,'old',' ')
803     continue
c       enddo   loop ifile call picnam(ir,iw,1,'o',fname(0))
c       output file call picopn(iu(0),fname(0),lrec,'new',' ')

write(iw,52)
52      format(' a(add),m(mul),d(div) ?')
        read(ir,54) com
54      format(a1)

do 804 i=1,n
        write(iw,56) i
56      format(1x,i5,' th factor (real) ?')
        read(ir,*) f(i)
58      format(f)
804     continue
c       enddo   loop i 60      write(iw,62)
62      format(' overall normalization factor (real) ?')
        read(ir,*) f(0)
64      format(f)
        if(f(0).eq.0.) go to 60 call engine(ir,iw,iu,lrec,fname
     1,ne,nl,ixl,ixh,ihl,iyh,buf,n,f,com)

do 821 ifile=0,n
        close(iu(ifile))
821     continue
c       enddo   !loop ifile end c------------------------------------------------------------------------ subroutine engine(ir,iw,iu,lrec,fname
     1,ne,nl,ixl,ixh,ihl,iyh,buf,n,f,com)

character*1 com
        character*32 fname(0:n)
        dimension buf(0:ne-1,0:n),iu(0:n),f(0:n)

write(iw,12) com,n
12      format(' engine: com,n =',a1,i5)
```

```
              do 801 i=1,n
              write(iw,14) f(i)
14            format(9x,'f(i) = ',t35,e15.5)
801           continue
c             enddo    loop i write(iw,16) f(0)
16            format(/,9x,'overall normalization =',e15.5)
              write(iw,705) ixl,ixh,iyl,iyh
705           format(' ixl,ixh,iyl,iyh = ',4i5)

do 802 iy=iyl+1,iyh+1
c             since irec starts from 1 do 803 ifile=1,n
              read(iu(ifile),rec=iy) (buf(i,ifile),i=0,ne-1)
803           continue
c             enddo    loop ifile do 804 ix=ixl,ixh
              buf(ix,0)=f(1)*buf(ix,1)
804           continue
c             enddo    !loop ix do 805 ifile=2,n
              if(com.eq.'a'.or.com.eq.'A') then
                      do 811 ix=ixl,ixh
                      buf(ix,0)=buf(ix,0)+f(ifile)*buf(ix,ifile)
811                   continue
c                     enddo    loop ix
              else if(com.eq.'m'.or.com.eq.'M') then
                      do 812 ix=ixl,ixh
                      buf(ix,0)=buf(ix,0)*f(ifile)*buf(ix,ifile)
812                   continue
c                     enddo    loop ix
              else if(com.eq.'d'.or.com.eq.'D') then
                      do 813 ix=ixl,ixh
                      if(f(ifile)*buf(ix,ifile).ne.0.) then
                      buf(ix,0)=buf(ix,0)/(f(ifile)*buf(ix,ifile))
                      endif
c                     divide by zero ?

813                   continue
c                     enddo    loop ix
              endif
c             com 805           continue
c             enddo    !loop ifile do 806 ix=ixl,ixh
              buf(ix,0)=buf(ix,0)/f(0)
806           continue
c             enddo    loop ix write(iu(0),rec=iy) (buf(ix,0),ix=0,ne-1)

802           continue
c             enddo        loop iy return
              end c     svdnoi.for
c     calculate svd distribution for a noise patch c     oct-26-87
c     link with svd_util.for c     this program includes the mode options c     get a random block starting (ix0,iy0)
c     input band-pass noise patch (random file)
c     output : block size,ixsmpl,iysmpl
c              order,mean svd,sigma svd,ratio c     block size up to 40x40
```

Appendix D
Copyright 1988
Eastman Kodak Company

```fortran
      character*32 text,fname1,fname2 dimension  buf(0:1999,0:39)
      dimension  a(0:39,0:39),u(0:39,0:39),v(0:39,0:39)

data ir,iw/5,6/
      data iu1,iu2/51,52/ c     nbe: # of elements per block  (block size)
c     ne: number of pixels per linbe (e.g. 400 pixels, or 1136 pixels)
c     nl: number of linbes of the image write(iw,10)
10    format(/' svdnoi: calculate svd distribution for a noise patch'/)

call picsiz(ir,iw,'i',nc,ne,nl)
      call recsiz(ir,iw,ne,lform,lrec)
      call picnam(ir,iw,1,'i',fname1)
      call picopn(iu1,fname1,lrec,'old',' ')

call blksiz(ir,iw,nbe,nbl)
      call smplxy(ir,iw,ixsmpl,iysmpl)
      nbsize=nbe*ixsmpl text='output mean svd file'
      call ascnam(ir,iw,text,fname2)
      call ascopn(iu2,fname2,'new',' ')

write (iw,122)
122   format(' mode'
     1,/,t25,'0: 0    degree or 90 degree'
     2,/,t25,'1: 45   degree'
     3,/,t25,'2: 135 degree')
      write(iw,110)
110   format(' mode ?')
      read(ir,*) mode
111   format(i)

write(iw,140)
140   format(' ix0,iy0,nxtry,nytry ?')
      read(ir,*) ix0,iy0,nxtry,nytry
142   format(4i)

call hui(ir,iw,iu1,lrec,buf,nc,ne,nl,a,u,v
     1,nbe,ixsmpl,iysmpl,nbsize,ix0,iy0,nxtry,nytry,mode
     2,iu2,fname1,fname2)

close(iu1)
      close(iu2)

end c---------------------------------------------------------------- subroutine hui(ir,iw,iu1,lrec,buf,nc,ne,nl,a,u,v
     1,nbe,ixsmpl,iysmpl,nbsize,ix0,iy0,nxtry,nytry,mode
     2,iu2,fname1,fname2)

c     this subroutinbe does all the actual processing.
c     main program just sets up array sizes for a given picture.

character*32 fname1,fname2 dimension  buf(0:ne-1,0:nbe-1)
      dimension  a(0:nbe-1,0:nbe-1)
      dimension  u(0:nbe-1,0:nbe-1),v(0:nbe-1,0:nbe-1)

dimension  work(100)
      dimension  sigma(0:39),id(0:39)
      dimension  fmean(0:39),fsigma(0:39),ratio(0:39)

dimension  fsum1(0:39),fsum2(0:39)

c     parameters for svd subroutinbe
      n=nbe
      m=nbe
      nm=nbe
```

```
      ftot=nxtry*nytry
      ftot=ftot*ixsmpl*iysmpl call clrx(nbe+1,fmean)

c     last of nbe for sum of singular values
      call clrx(nbe+1,fsigma)
      call clrx(nbe+1,fsum1)
      call clrx(nbe+1,fsum2)

write(iw,800) mode,ix0,iy0,nxtry,nytry
     1,nbe,ixsmpl,iysmpl,nbsize
800   format(' hui: mode,ix0,iy0,nxtry,nytry = ',5i5,/
     1,6x,'nbe,ixsmpl,iysmpl,nbsize = ',4i5)

ln=iy0 c     skip (iy0-1) lines do 901 iy=0,nytry-1
c     number of loops in y direction
      line1=iy0+iy*nbsize+1 do 902 iys=0,iysmpl-1
      line2=line1+iys do 903 j=0,nbe-1
c     read nbe linbes
            irec=line2+j*iysmpl
            read(iul,rec=irec) (buf(i,j),i=0,ne-1)
c     just read ne elements
903   continue
c           enddo            loop nbe do 904 ix=0,nxtry-1
c     number of loops in x direction ixoff1=ix0+nbsize*ix
      if(mode.eq.1) then
            ixoff1=ixoff1+nbsize/2
      else if(mode.eq.2) then
            ixoff1=ixoff1-nbsize/2
      endif do 905 ixs=0,ixsmpl-1
      ixoff2=ixoff1+ixs do 906 j=0,nbe-1
c     get a block into a(k,j)
         do 907 k=0,nbe-1
         kk=ixoff2+k*ixsmpl
         if(mode.eq.0)then
           a(k,j)=buf(kk,j)
c     straight
         else if(mode.eq.1)then
           a(k,j)=buf(kk-j,j)
c     45 degree slant
         else if(mode.eq.2)then
           a(k,j)=buf(kk+j,j)
c     135 degree slant
         endif
c     mode?
907   continue
906   continue
c           end of loop j
c           end of loop k call svd(nm,m,n,a,sigma,.false.,u,.false.,v,ierr,work)
c     no need to calculate U and V matrix. so the input is .false.

if(ierr.ne.0) write(iw,20) ierr,line2,ixoff2
20    format(' trouble. ierr= ',i4,' at line2,ixoff2 = ',2i5)

call sort(nbe,sigma,id)
c     sort in descending order c     sigma(i,l(id)): ith singular value toteig=0.
```

```
c              sum of eigen values
               do 911 l=1,nbe-1
               toteig=toteig+sigma(l)
911     continue
c              end of loop l do 912 l=0,nbe
               if(l.eq.nbe) then
               fsum1(l)=fsum1(l)+toteig
               fsum2(l)=fsum2(l)+toteig**2
               else
               fsum1(l)=fsum1(l)+sigma(l)
               fsum2(l)=fsum2(l)+sigma(l)**2
               endif
912     continue
c       end of loop l 905     continue
c       end of loop ixs
904     continue
c       end of loop ix 902     continue
c       end of loop iys
901     continue
c       end of loop iy
c       ok now calculate statistics write(iw,100)
100     format(3x,1,10x,'fmean',10x,'fsigma')

do 913 l=0,nbe
        fmean(l)=fsum1(l)/ftot
        fsigma(l)=fsum2(l)/ftot-fmean(l)**2
                if(fsigma(l).lt.0.) then
                write(5,105) l,fmean(l),fsigma(l)
                fsigma(l)=0.
                endif
105     format(' l,fmean(l),fsigma(l) = ',i5,2e15.5)

fsigma(l)=sqrt(fsigma(l))

if(fsigma(l).eq.0.) then
        ratio(l)=0.
        else
        ratio(l)=fmean(l)/fsigma(l)
        endif
c       fsigma(l) ?

913     continue
c       end of loop l write(iu2,108) nbe,ixsmpl,iysmpl
108     format(1x,3i10)

do 921 l=0,nbe
c       write final result
        if(l.eq.nbe) then
        write(iw,110) fmean(l),fsigma(l),ratio(l)
        write(iu2,110) fmean(l),fsigma(l),ratio(l)
110     format(//,6x,3e15.5)
        else
        write(iw,120) l,fmean(l),fsigma(l),ratio(l)
        write(iu2,120) l,fmean(l),fsigma(l),ratio(l)
120     format(1x,i5,3e15.5)
        endif
921     continue
c       enddo write(iu2,130) fname2,fname1
130     format(/' svd noise file name = ',a32
     1,/,' from data file: ',a32)

write(iu2,140) nc,ne,nl
140     format(//,' input parameters were: nc,ne,nl = ',3i5)
        write(iu2,150) nbe,ixsmpl,iysmpl,mode,ix0,iy0,nxtry,nytry
```

```
150    format(' nbe,ixsmpl,iysmpl = ',3i5
      1,/,' mode,ix0,iy0,nxtry,nytry = ',5i5)

return
       end c      SHARPENING AND NOISE SUPPRESSION BY SINGULAR VALUE DECOMPOSITION c      SVD_BASIC.FOR  -- BASIC VERSION
                                                        Appendix E
c           link with svd_util.for                      Copyright 1988
                                                        Eastman Kodak Compan
c      DEC-20-88 c      maximum svd block size : 0x40 dimension  BUFI(0:1999,0:39)
       dimension  BUFO(0:1999,0:39)
       dimension  A(0:39,0:39),U(0:39,0:39),V(0:39,0:39)
       dimension  WT(0:39)
       dimension  FC(0:39),DFC(0:39),RATIO(0:39)

data IR,IW/5,6/ data iui,iuo,iun/51,52,53/
       data iuw/61/
       data a,u,v/1600*0.,1600*0.,1600*0./
       data wt/40*0./
       data fc,dfc,ratio/40*0.,40*0.,40*0./ c      NBE: # of elements per block   (BLOCK SIZE)
c      NE: number of pixels per line (e.g. 500 pixels)
c      NL: number of lines of the image
c      ixsmpl,iysmpl : sampling in x and y directions c      INPUT c      define image size : nc,ne,nl
       call picsiz (ir,iw,'I',nc,ne,nl)

c      define image record size
       call recsiz (ir,iw,ne,lform,lrec)

c      open input image file
       call ifile (ir,iw,iui,lform,lrec)

c      read noise data file
       call nfile (ir,iw,iun,nbe,ixsmpl,iysmpl,fc,dfc,ratio)

c      open output image file
       call ofile (ir,iw,iuo,lform,lrec)

c      get pre/post processing weights
       call wfile (ir,iw,iuw,modew,nbe,wt,sum )

write (iw,122)
122    format (' Starting pixel position: IX0,IY0 ?')
       read (ir,*) ix0,iy0 c      block orientation mode = 0 (0 or 90 degree)

modeb=0 write (iw,151)
151    format (' Boost formula'
      3,/,' 6: THRESHOLD1 ,EXP(-A*X**4) AND FMIN,FMAX')

write (iw,152)
152    format (' Boost formula(I) ?')
       read (ir,*) iform write (iw,162)

162    format (' THRSH1(R),POWER(R),FMIN,FMAX,COEFF(FOR 6:) ?')
       read (ir,*) thrshl,power,fmin,fmax,coeff msize = ixsmpl*(nbe-1)+1
       nbsize = ixsmpl*nbe
```

```
            write (iw,202) nbe,ix0,iy0,ixsmpl,iysmpl,msize,nbsize
202     format (' MAIN: NBE,IX0,IY0 = ',T30,3I8
       1,/,' MAIN: IXSMPL,IYSMPL = ',T30,2I8
       2,/,' MAIN: SUPPORT SIZE = ',T30,I8
       3,/,' MAIN: NBE*IXSMPL = ',T30,I8 )
204     format (' MODEW, SUM OF WEIGHTS = ',I5,E15.5)

if (modew.ne.0) then
           write (iw,204) modew,sum
        endif jy0 = iy0
            jx0 = ix0 call hui (ir,iw,iui,iuo,nc,ne,nl,nbe,ixsmpl,iysmpl
       1              ,bufi,bufo,a,u,v,fc,dfc,ratio
       2              ,iform,thrshl,coeff,power,fmin,fmax
       3              ,jx0,jy0,modew,wt,lrec)

if (modew.eq.1.or.modew.eq.2) then
           denom = (sum*sum)/(nbe*nbe)
           call dskdiv (iuo,iuo,lrec,bufo,ne,nl,denom)
        endif
c       close (iui)
c       close (iuo)

end c----------------------------------------------------------------------- subroutine hui(ir,iw,iui,iuo,nc,ne,nl,nbe,ixsmpl,iysmpl
       1              ,bufi,bufo,a,u,v,fc,dfc,ratio
       2              ,iform,thrshl,coeff,power,fmin,fmax
       3              ,jx0,jy0,modew,wt,lrec)

c       THIS SUBROUTINE DOES ALL THE ACTUAL PROCESSING.
c       MAIN PROGRAM JUST SETS UP ARRAY SIZES FOR A GIVEN PICTURE.

dimension  bufi(0:ne-1,0:nbe-1)
        dimension  bufo(0:ne-1,0:nbe-1)
        dimension  a(0:nbe-1,0:nbe-1)
        dimension  u(0:nbe-1,0:nbe-1),v(0:nbe-1,0:nbe-1)
        dimension  work(100)
        dimension  fc(0:39),dfc(0:39),ratio(0:39)
        dimension  id(0:39),sigma(0:39)
        dimension  wt(0:nbe-1)

n      = nbe
        m      = nbe
        nm     = nbe
        nbrxs  = nbe*ixsmpl nxtry  = (ne-jx0-nbe)/nbrxs-1
        nytry  = (nl-jy0-nbe)/nbrxs
        if (((nytry-1)*nbrxs +nbe).gt.nl) then
           nytry = nytry-1
        endif
        lextra = nl-nytry*nbrxs-jy0
            write (iw,802) nbe,ixsmpl,iysmpl
       1 ,iform,thrshl,power,fmin,fmax,coeff
802        format (' HUI: nbe,ixsmpl,iysmpl= ',3i5,/
       1 ' boost formula,thrshl,power,fmin,fmax,coeff = '
       2 ,/,1x,I5,5E15.5)
            write (iw,835) jx0,jy0,nxtry,nytry
835        format (/,' HUI: jx0,jy0,nxtry,nytry',4i5)

c       skip jy0 lines if (jy0.ge.1)then
            do 840, iy = 0,jy0 -1
            irec = iy+1
            read (iui,rec=irec) (bufi(i,0),i=0,ne-1)
            write (iuo,rec=irec) (bufi(i,0),i=0,ne-1)
840         continue
        endif
```

```
c     processing the input image block by block do 910, iy = 0,nytry-1
        line1 = jy0+1+iy*nbrxs do 910, iys = 0,iysmpl-1
          line2 = line1+iys c     read in nbe lines from the input image into bufi
      do 850, j = 0,nbe-1
        linei = line2+j *iysmpl
        read (iui,rec=linei) (bufi(i,j),i=0,ne-1)

c     initialize the output buffer -- bufo do 845, jj = 0,nbe-1
      do 845, ii = 0,ne-1
      bufo(ii,jj) = 0.
845   continue
850   continue c     set up array A(i,j)

do 900, ix = 0,nxtry-1
        ixoff1 = jx0 +nbrxs*ix do 900, ixs = 0,ixsmpl-1
          ixoff2 = ixoff1+ixs+(nbe/2)*ixsmpl
          do 860, j = 0,nbe-1
          do 860, i = 0,nbe-1
          ii = ixoff2+i*ixsmpl
          a(i,j) = bufi(ii,j)
860       continue
          call svd (nm,m,n,a,sigma,.true.,u,.true.,v,i   ,work)

if (ierr.ne.0) then
              write (iw,20) ix,iy,ierr
20            format (' TROUBLE. IX,IY,IERR= ',3I6)
              do 865, l = 0,nbe-1
                write (iw,22) l,sigma(l)
22            format (1x,i3,'th singular value = ',E15.5)
865           continue
              do 866 i=0,ierr-1
              sigma(i)=0.
866           continue
          endif c     sort sigma(--singular values) in descending order call sort (nbe,sigma,id)

c     SIGMA(I,L(ID)): Ith SINGULAR VALUE

C     COMPUTE NEW A(I,J) ACCORDING TO CORING FORMULAR(IFORM) FROM
C     SIGMA, U, AND V.
      call newaij (ir,iw,nbe,id,a,sigma,u,v,fc,dfc,ratio
     1             ,iform,thrshl,coeff,power,fmin,fmax)

if (modew.eq.-1) then
            do 885, j = 0,nbe-1
            do 885, i = 0,nbe-1
            a(i,j) = a(i,j)/wt(i)/wt(j)
885         continue
          else if (modew.eq.1) then
            do 890, j = 0,nbe-1
            do 890, i = 0,nbe-1
            a(i,j) = a(i,j)*wt(i)*wt(j)
890         continue
          endif

C     UPDATE OUTPUT BUFFER : BUFO do 895, j = 0,nbe-1
          jj =j
            do 895, i = 0,nbe-1
            ii =ixoff2+i*ixsmpl
            bufo(ii,jj) = bufo(ii,jj)+a(i,jj)
895       continue
```

```
900      continue
C        WRITE LINES OUT TO DISK (AFTER NN LINES, MM BLOCKS ARE PROCESSED)

do 905, j =0,nbe-1
            lineo = line2+j*iysmpl
            write (iuo,rec=lineo) (bufo(i,j),i=0,ne-1)
905      continue 910      continue
C        WRITE OUT REMAINING LINES if (lextra.gt.0) then
            line3 = nl-lextra+1
            do 915, iy = 0,lextra-1
               irec = line3+iy
               read (iui,rec=irec) (bufi(i,0),i=0,ne-1)
               write (iuo,rec=irec) (bufi(i,0),i=0,ne-1)
915         continue
         endif return
         end c------------------------------------------------------ subroutine newaij (ir,iw,nbe,id,a,sigma,u,v,fc,dfc,ratio
        1,iform,thrshl,coeff,power,fmin,fmax)

logical first
         dimension a(0:nbe-1,0:nbe-1)
         dimension sigma(0:nbe-1),id(0:nbe-1)
         dimension u(0:nbe-1,0:nbe-1),v(0:nbe-1,0:nbe-1)
         dimension fc(0:39),dfc(0:39),ratio(0:39)

data first/.true./ if(first) then
            write (iw,8888) iform,thrshl,power,fmin,fmax,coeff
8888        format (' newaij: iform,t1,p,t2,c = ',i5,4f6.2)
            first=.false.
         endif do 100, j = 0,nbe-1
            do 100, i = 0,nbe-1
               a(i,j) = 0.
100      continue c        determine threshold formula if(iform.eq.6) then
            call iform6(ir,iw,nbe,id,a,sigma,u,v,fc,dfc,ratio
        1,iform,thrshl,coeff,power,fmin,fmax)
         endif return
         end c------------------------------------------------------
c        Boost formula 6 subroutine iform6 (ir,iw,nbe,id,a,sigma,u,v,fc,dfc,ratio
        1,iform,thrshl,coeff,power,fmin,fmax)

dimension a(0:nbe-1,0:nbe-1)
         dimension sigma(0:nbe-1),id(0:nbe-1)
         dimension u(0:nbe-1,0:nbe-1),v(0:nbe-1,0:nbe-1)
         dimension fc(0:39),dfc(0:39),ratio(0:39)

do 120, l = 0,nbe-1 c        depending on IFORM choose threshold level ff = 1.

if (sigma(l).ge.0.) then
               zz = (sigma(l)-fc(l))/dfc(l)
```

```
           if (zz.le.thrshl) then
             ff = fmin
           else if (zz.gt.thrshl) then
             arg = coeff*((zz-thrshl)**power)
             if (arg.le.0.000000001) then
               delf = delf*(1.+arg)
             else if (arg.gt.0.000000001.and.arg.le.10.) th
               delf = delf*(1.-exp(-arg))
             else if (arg.gt.10.) then
               delf = delf
             endif
c                end of arg ?

ff = fmin + delf
           endif
c                end of (zz...

else if(sigma(l).eq.0.) then
         ff=1.

write (iw,505) ix,iy,l,sigma(l)
505          format (' ix,iy,l,sigma(l)',3i5,e15.5)
             ff = 1.
           endif
c          end of (sigma(l)...

do 110, j = 0,nbe-1
             do 110, i = 0,nbe-1
               a(i,j) = a(i,j)+ff*sigma(l)*u(i,id(l))*v(j,id(l))
110        continue 120     continue
        return
        end
c------------------------------------------------ subroutine nfile(ir,iw,iun,nbe,ixsmpl,iysmpl,fc,dfc,ratio)

character*32      text,fname dimension fc(0:nbe-1),dfc(0:nbe-1),ratio(0:nbe-1)

text='svd noise file for   0 degree'
        call ascnam(ir,iw,text,fname)
        call ascopn(iun,fname,'old',' ')

read(iun,*) nbe,ixsmpl,iysmpl write(iw,115) fname
115       format(' noise file:',a32,/
     1 1x,'order',10x,' mean',10x,'sigma',10x,'ratio')

do 802 l=0,nbe-1
        read(iun,*) iorder,fc(l),dfc(l),ratio(l)
        write(iw,116) iorder,fc(l),dfc(l),ratio(l)
116       format(1x,i5,3e15.5)
802       continue
c            enddo      !loop l
        close(unit=iun)

return
        end c    svd_util.for                                           Appendix F
c    subroutines called by :                                Copyright 1988
c                        filter.for,  convol.for, ingn.for  Eastman Kodak
c                        svd_basic.for,  svd_move.for            Company
c                        svdnoi.for, and svd_move_3ori.for
c
c    OCT-26-87
c-----------------------------------------------------------------------
        subroutine svd(nm,m,n,a,w,matu,u,matv,v,ierr,rv1)
c                                                compute svd
c       sort(n,s,id)                             sort svd
c       ifile(ir,iw,iui,lform,lrec)              open input picture file
c       ofile(ir,iw,iuo,lform,lrec)              open output picture file
c       wfile(ir,iw,iuw,modew,nbe,wt,sum)        get pre/post processing weights
```

```
c         picsiz(ir,iw,mode,nc,ne,nl)              asks picture size
c         recsiz(ir,iw,ne,lform,lrec)              asks record size
c         winsiz(ir,iw,ne,nl,ixl,iyl,ixh,iyh)      asks window size
c         boxsiz(ir,iw,ix0,iy0,nx,ny)              asks box size
c         xyorig(ir,iw,ix0,iy0)                    asks xy origin
c         blksiz(ir,iw,nbe,nbl)                    asks block size
c         smplxy(ir,iw,ixsmpl,iysmpl)              asks sampling steps
c         dirnam(ir,iw,dname)                      asks directory name
c         picnam(ir,iw,nfiles,mode,fname)          asks file names
c         picopn(iu,fname,lrec,status,com)         opens a picture file
c         ascopn(iu,fname,status,com)              opens an ascii file
c         ascnam(ir,iw,text,fname)                 asks an ascii file name
c         clrasc(n,text)                           clears an ascii array
c         rdlin(iu,n,buf,com,irec)                 read a line
c         wrlin(iu,n,buf,com,irec)                 write a line
c         ptr0(n,lp)                               pointer initialization
c         ptr(n,lp)                                update a line pointer
c         clr(n,z)                                 z(i)=0
c         movxs(n,ixs,buf,pic)                     pic(i) gets sampled buf(i)
c         movxsi(n,ixs,pic,buf)                    inverse of movxs
c         mulcy(n,c,y,z)                           z(i)=z(i)+c*y(i)
c         dskdiv(iuil,iu2,lrec,buf,ne,nl,fdiv)
c                  read a line, div by const. and write back c---------------------------------------------------------------------
c
      subroutine svd(nm,m,n,a,w,matu,u,matv,v,ierr,rvl)
      integer i,j,k,l,m,n,ii,il,kk,kl,ll,l1,mn,nm,its,ierr
      real a(nm,n),w(n),u(nm,n),v(nm,n),rvl(n)
      real c,f,g,h,s,x,y,z,scale,anorm
      logical matu,matv
c
c this subroutine is from the book "computer methods for mathematical
c computations" by g.e. forsythe, m.a. malcolm, and c.b. moler, 1977.
c prentice-hall, inc., englewood cliffs, new jersey 07632. pp.229-235.
c
c this subroutine determines the singular value decomposition
c         t
c  a=usv of a real m by n rectangular matrix. householder
c bidiagonalization and a variant of the qr algorithm are used.
c
c on input:
c   nm must be set to the row dimension of two-dimensional array
c   parameters as declared in the calling program dimension statement.
c   note that nm must be at least as large as the maximum of m and n.
c
c   m is the number of rows of a (and u).
c   n is the number of columns of a (and u) and the order of v.
c   a contains the rectangular array to be decomposed.
c
c   matu should be set to .true. if the u matrix in the decomposition
c   is desired, and to .false. otherwise.
c
c   matv should be set to .true. if the v matrix in the decomposition
c   is desired, and to .false. otherwise.
c
c on output:
c   a is unaltered (unless overwritten by u or v).
c
c   w contains the n (non-negative) singular values of a (the
c   diagonal elements of s). they are unordered. if an error exit
c   is made, the singular values should be correct for indices
c   ierr+1, ierr+2, ..., n.
c
c   u contains the matrix u (orthogonal column vectors) of the
c   decomposition if matu has been set to .true. otherwise, u is
c   used as a temporary array. u may coincide with a. if an error
c   exit is made, the columns of u corresponding to indices of
c   correct singular values should be correct.
c
c   v contains the matrix v (orthogonal) of the
c   decomposition if matu has been set to .true. otherwise, v is
c   not referenced. v may also coincide with a if u is not needed.
c   if an error exit is made, the columns of v corresponding to
c   indices of correct singular values should be correct.
c
c   ierr is set to
c     zero    for normal return
```

```
c     k            if the k-th singular value has not been determined
c                  after 30 iterations.
c
c     rvl is a temporary storage array.
c
           ierr=0
           do 100 j=1,n
           do 100 i=1,m
           u(i,j)=a(i,j)
100        continue
c     householder reduction to bidiagonal form
           g=0.0
           scale=0.0
           anorm=0.0
c
           do 300 i=1,n
           l=i+1
           rvl(i)=scale*g
           g=0.0
           s=0.0
           scale=0.0
           if(i.gt.m) goto 210
c
           do 120 k=i,m
120        scale=scale+abs(u(k,i))
c
           if(scale.eq.0.0) goto 210
c
           do 130 k=i,m
           u(k,i)=u(k,i)/scale
           s=s+u(k,i)**2
130        continue
c
           f=u(i,i)
           g=-sign(sqrt(s),f)
           h=f*g-s
           u(i,i)=f-g
           if(i.eq.n) goto 190
c
           do 150 j=l,n
           s=0.0
c
           do 140 k=i,m
140        s=s+u(k,i)*u(k,j)
c
           f=s/h
c
           do 150 k=i,m
           u(k,j)=u(k,j)+f*u(k,i)
150        continue
c
190        do 200 k=i,m
200        u(k,i)=scale*u(k,i)
c
210        w(i)=scale*g
           g=0.0
           s=0.0
           scale=0.0
           if(i.gt.m.or.i.eq.n) goto 290
c
           do 220 k=l,n
220        scale=scale+abs(u(i,k))
c
           if(scale.eq.0.0) goto 290
c
           do 230 k=l,n
           u(i,k)=u(i,k)/scale
           s=s+u(i,k)**2
230        continue
c
           f=u(i,l)
           g=-sign(sqrt(s),f)
           h=f*g-s
           u(i,l)=f-g
c
           do 240 k=l,n
240        rvl(k)=u(i,k)/h
c
           if(i.eq.m) goto 270
```

```
c
          do 260 j=1,m
          s=0.0
c
          do 250 k=1,n
250       s=s+u(j,k)*u(i,k)
c
          do 260 k=1,n
          u(j,k)=u(j,k)+s*rv1(k)
260       continue
c
270       do 280 k=1,n
280       u(i,k)=scale*u(i,k)
c
290       anorm=amax1(anorm,abs(w(i))+abs(rv1(i)))
300       continue
c ... accumulation of right-hand transformations .....
          if(.not.matv) goto 410
c ... for i=n step -1 until 1 do ....
          do 400 ii=1,n
          i=n+1-ii
          if(i.eq.n) goto 390
          if(g.eq.0.0) goto 360
c
          do 320 j=l,n
c ... double division avoids possible underflow ....
320       v(j,i)=(u(i,j)/u(i,l))/g
c
          do 350 j=l,n
          s=0.0
c
          do 340 k=l,n
340       s=s+u(i,k)*v(k,j)
c
          do 350 k=l,n
          v(k,j)=v(k,j)+s*v(k,i)
350       continue
c
360       do 380 j=l,n
          v(i,j)=0.0
          v(j,i)=0.0
380       continue
c
390       v(i,i)=1.0
          g=rv1(i)
          l=i
400       continue
c ... accumulation of left-hand transformations ...
410       if(.not.matu) goto 510
c ... for i=min(m,n) step -1 until 1 do ...
          mn=n
          if(m.lt.n) mn=m
c
          do 500 ii=1,mn
          i=mn+1-ii
          l=i+1
          g=w(i)
          if(i.eq.n) goto 430
c
          do 420 j=l,n
420       u(i,j)=0.0
c
430       if(g.eq.0.0) goto 475
          if(i.eq.mn) goto 460
c
          do 450 j=l,n
          s=0.0
c
          do 440 k=l,m
440       s=s+u(k,i)*u(k,j)
c ... double division avoids possible underflow
          f=(s/u(i,i))/g
c
          do 450 k=i,m
          u(k,j)=u(k,j)+f*u(k,i)
450       continue
c
460       do 470 j=i,m
```

```
470       u(j,i)=u(j,i)/g
c
          goto 490
c
475       do 480 j=i,m
480       u(j,i)=0.0
c
490       u(i,i)=u(i,i)+1.0
500       continue
c
c  diagonalization of the bidiagonal form ...
c  for k=n step -1 until 1 do ...
510       do 700 kk=1,n
          k1=n-kk
          k=k1+1
          its=0
c  test for splitting
c       for l=k step -1 until 1 do ...
520       do 530 ll=1,k
          l1=k-ll
          l=l1+1
          if(abs(rv1(l))+anorm.eq.anorm) goto 565
c  rv1(1) is always zero, so there is no exit
c       through the bottom of the loop ...
          if(abs(w(l1))+anorm.eq.anorm) goto 540
530       continue
c  cancellation of rv1(l) if l greater than 1 ...
540       c=0.0
          s=1.0
c
          do 560 i=l,k
          f=s*rv1(i)
          rv1(i)=c*rv1(i)
          if(abs(f)+anorm.eq.anorm) goto 565
          g=w(i)
          h=sqrt(f*f+g*g)
          w(i)=h
          c=g/h
          s=-f/h
          if(.not.matu) goto 560
c
          do 550 j=1,m
          y=u(j,l1)
          z=u(j,i)
          u(j,l1)=y*c+z*s
          u(j,i)=-y*s+z*c
550       continue
c
560       continue
c  test for convergence ..
565       z=w(k)
          if(l.eq.k) goto 650
c    shift from bottom 2x2 minor ...
          if(its.eq.30) goto 1000
          its=its+1
          x=w(l)
          y=w(k1)
          g=rv1(k1)
          h=rv1(k)
          f=((y-z)*(y+z)+(g-h)*(g+h))/(2.0*h*y)
          g=sqrt(f*f+1.0)
          f=((x-z)*(x+z)+h*(y/(f+sign(g,f))-h))/x
c  next qr transformation ...
          c=1.0
          s=1.0
c
          do 600 i1=l,k1
          i=i1+1
          g=rv1(i)
          y=w(i)
          h=s*g
          g=c*g
          z=sqrt(f*f+h*h)
          rv1(i1)=z
          c=f/z
          s=h/z
          f=x*c+g*s
          g=-x*s+g*c
```

```
            h=y*s
            y=y*c
            if(.not.matv) goto 575
c
            do 570 j=1,n
            x=v(j,i1)
            z=v(j,i)
            v(j,i1)=x*c+z*s
            v(j,i)=-x*s+z*c
570         continue
c
575         z=sqrt(f*f+h*h)
            w(i1)=z
c rotation can be arbitrary if z is zero ...
            if(z.eq.0.0) goto 580
            c=f/z
            s=h/z
580         f=c*g+s*y
            x=-s*g+c*y
            if(.not.matu) goto 600
c
            do 590 j=1,m
            y=u(j,i1)
            z=u(j,i)
            u(j,i1)=y*c+z*s
            u(j,i)=-y*s+z*c
590         continue
c
600         continue
c
            rv1(l)=0.0
            rv1(k)=f
            w(k)=x
            goto 520
c convergence ...
650         if(z.ge.0.0) goto 700
c w(k) is made non-negative ...
            w(k)=-z
            if(.not.matv) goto 700
c
            do 690 j=1,n
690         v(j,k)=-v(j,k)
c
700         continue
c
            goto 1001
c set error .. no convergence to a singular value
c                       after 30 iterations ...
1000        ierr=k
1001        return
            end c----------------------------------------------------------------- subroutine sort(n,s,id)
            dimension s(0:49),id(0:49)
c
c       arrary id contains index of array s after sorting permutation
c
            do 20 i=0,n-1
            id(i)=i
20          continue do 30 j=1,n-1
               v=s(j)
               idv=id(j)
               do 40 i=0,j-1
                  if(v.lt.s(i)) goto 40
                  do 50 k=i,j-1
                     i1=j+i-k
                     i2=i1-1
                     s(i1)=s(i2)
                     id(i1)=id(i2)
50                continue
                  s(i)=v
                  id(i)=idv
                  go to 30
```

```fortran
40         continue
30       continue
         return
         end c---------------------------------------------------------------- subroutine ifile(ir,iw,iui,lform,lrec)

character*32      fnamei call picnam(ir,iw,1,'i',fnamei)
         call picopn(iui,fnamei,lrec,'old',' ')
c         !readonly return
         end c---------------------------------------------------------------- subroutine ofile(ir,iw,iuo,lform,lrec)

character*32      fnameo call picnam(ir,iw,1,'o',fnameo)
         call picopn(iuo,fnameo,lrec,'new',' ')

return
         end c---------------------------------------------------------------- subroutine wfile(ir,iw,iuw,modew,nbe,wt,sum)

character*32 text,wname dimension wt(0:nbe-1)

write(iw,402)
402          format(' weight option(-1:2)'
     1,/,' -1: pre weighting'
     1,/,'  0: no weighting'
     1,/,'  1: post weighting'
     1,/,'  2: pre and post weighting'
     1,/,' weight mode ?')
         read(ir,*) modew
c408         format(i)

if(modew.ne.0) then text='1-dim weight file'
         call ascnam(ir,iw,text,wname)
         call ascopn(iuw,wname,'old',' ')

read(iuw,*) nbew,idum,idum,idum,gsigma,dummy
              if(nbew.ne.nbe) then
              write(iw,*) 'nbe.ne.nbew'
              stop
              endif
         do 801 i=0,nbe-1
         read(iuw,*) iorder,wt(i)
c424         format(1x,i5,e15.5)
801        continue
c          enddo        !loop i sum=0.
         do 802 i=0,nbe-1
         sum=sum+wt(i)
802        continue
c          enddo        !loop i endif
c         !modew ?

return
         end c----------------------------------------------------------------
```

```
      subroutine picsiz(ir,iw,mode,nc,ne,nl)

character*1 mode if(mode.eq.'i'.or.mode.eq.'I') then
1       write(iw,2)
2         format(' input image size: colors,elements,lines ?')
      else if(mode.eq.'o'.or.mode.eq.'O') then
        write(iw,4)
4         format(' output image size: colors,elements,lines ?')
      endif read(ir,*) nc,ne,nl write(iw,20) nc,ne,nl
20      format(' picsiz: nc,ne,nl = ',3i7)

return
      end c----------------------------------------------------------------- subroutine recsiz(ir,iw,ne,lform,lrec)

1     write(iw,10)
10      format(' format 69 or 81 or 99(sun) or 77(cray) (i) ?')
      read(ir,*) lform if(lform.eq.69) then
      lrec=ne
      else if(lform.eq.77) then
      lrec=ne*8
      else if(lform.eq.99) then
      lrec=ne*4
c       !since sun recordlength is in bytes
      else if(lform.eq.81) then
      lrec=((ne*4-1)/512+1)*512/4
c       !(ne*4) bytes
      endif
      write(iw,20) lform,lrec
20      format(' recsiz: lform = ',i5,' lrec = ',i5)

return
      end c----------------------------------------------------------- subroutine winsiz(ir,iw,ne,nl,ixl,ixh,iyl,iyh)

10      write(iw,12)
12        format(' window size: ixl,ixh,iyl,iyh ?')
      read(ir,*) ixl,ixh,iyl,iyh if(ixl.eq.0.and.ixh.eq.0) then
      ixl=0
      ixh=ne-1
      endif
c       !ixl,ixh if(iyl.eq.0.and.iyh.eq.0) then
      iyl=0
      iyh=nl-1
      endif
c       !iyl,iyh write(iw,20) ixl,ixh,iyl,iyh
20      format(' window: ixl,ixh,iyl,iyh = ',4i5)

return
      end c----------------------------------------------------------- subroutine boxsiz(ir,iw,ix0,iy0,nx,ny)

write(iw,10)
10      format(' ix0,iy0,nx,ny ?')
      read(ir,*) ix0,iy0,nx,ny
```

```
          write(iw,20) ix0,iy0,nx,ny
20          format(' boxsiz: ix0,iy0,nx,ny = ',4i5)

return
          end c------------------------------------------------- subroutine xyorig(ir,iw,ix0,iy0)

write(iw,10)
10          format(' ix0,iy0 ?')
          read(ir,*) ix0,iy0 write(iw,20) ix0,iy0
20          format(' xyorig: ix0,iy0 = ',2i5)

return
          end c------------------------------------------------- subroutine blksiz(ir,iw,nbe,nbl)

write(iw,10)
10          format(' block size nbe,nbl ?')
          read(ir,*) nbe,nbl write(iw,20) nbe,nbl
20          format(' blksiz: nbe,nbl = ',2i5)

return
          end c------------------------------------------------- subroutine smplxy(ir,iw,ixsmpl,iysmpl)

write(iw,10)
10          format(' sampling ixsmpl,iysmpl ?')
          read(ir,*) ixsmpl,iysmpl write(iw,20) ixsmpl,iysmpl
20          format(' smplxy: ixsmpl,iysmpl = ',2i5)

return
          end c------------------------------------------------- subroutine picnam(ir,iw,nfiles,mode,fname)

character*1 mode
          character*32 fname(0:nfiles-1)

do 1 ifile=0,nfiles-1 if(mode.eq.'i'.or.mode.eq.'I') then
          write(iw,22) ifile
22          format(1x,i3,'th input picture file (a32) ?')
          else if (mode.eq.'o'.or.mode.eq.'O') then
          write(iw,24) ifile
24          format(1x,i3,'th output picture file (a32) ?')
          endif
c          !mode?

read(ir,25) fname(ifile)
25          format(a32)
1          continue return
          end c------------------------------------------------- subroutine picopn(iu,fname,lrec,status,com)

character*1 com
```

```
      character*3 status
      character*32 fname
      data iw/6/ if(com.eq.'s'.or.com.eq.'S') then
      open(unit=iu,file=fname,access='sequential',recl=lrec)
      else
      open(unit=iu,file=fname,access='direct',recl=lrec)
      endif write(iw,30) fname
30       format(' picopn: file = ',a32)

return
      end c----------------------------------------------------------- subroutine ascopn(iu,fname,status,com)

character*1 com
      character*3 status
      character*32 fname
      data iw/6/ open(unit=iu,file=fname)

write(iw,30) fname
30       format(' ascopn: file = ',a32)

return
      end c----------------------------------------------------------- subroutine ascnam(ir,iw,text,fname)

character*32 text,fname write(iw,10) text
10       format(1x,a32,' name (a32) ?')
      read(ir,12) fname
12       format(a32)

return
      end c----------------------------------------------------------- subroutine clrasc(n,text)

character*1 text(0:n-1)

do 1 i=0,n-1
      text(i)=' '
1       continue return
      end c-----------------------------------------------------------
c     read and write routines
c----------------------------------------------------------- subroutine rdlin(iu,n,buf,com,irec)

character*1 com
      dimension buf(0:0)

if(com.eq.'s'.or. .com.eq.'S') then
      read(iu) (buf(i),i=0,n-1)
      else
      read(iu,rec=irec) (buf(i),i=0,n-1)
      endif return
      end
```

```
c---------------------------------------------------- subroutine wrlin(iu,n,buf,com,irec)

character*1 com dimension buf(0:0)

if(com.eq.'s'.or. com.eq.'S') then
      write(iu) (buf(i),i=0,n-1)
      else
      write(iu,rec=irec) (buf(i),i=0,n-1)
      endif return
      end c---------------------------------------------------- subroutine ptr0(n,lp)

dimension lp(0:0)

do 1 i=0,n-1
      lp(i)=i
1     continue
c       !loop i return
      end c---------------------------------------------------- subroutine ptr(n,lp)

c     rotate the pointer by one
c     lp(0) will have the oldest data
c     lp(n-1) will have the newset data
c     first     lp(0)=0, lp(1)=1,lp(2)=2.lp(3)=3,....
c     then      lp(0)=1, lp(1)=2,lp(2)=3,lp(3)=4,....

dimension lp(0:0)

ll=lp(0)
c       !save do 1 i=0,n-2
      lp(i)=lp(i+1)
1     continue
c       !enddo      !loop i lp(n-1)=ll return
      end c----------------------------------------------------
c     arithmatic operation
c---------------------------------------------------- subroutine addc(n,c,z)

dimension z(0:n-1)

do 1 i=0,n-1
      z(i)=z(i)+c
1     continue
c       !enddo return
      end c---------------------------------------------------- subroutine clr(n,z)

dimension z(0:0)

do 1 i=0,n-1
```

```
              z(i)=0.
1          continue return
           end c----------------------------------------------------------- subroutine movxs(n,ixs,buf,pic)

dimension buf(0:0),pic(0:0)

if(ixs.eq.1) then
                   do 1 i=0,n-1
                   pic(i)=buf(i)
1                    continue
           else
c                    !sample buf and put into pic
                   do 2 i=0,n-1
                   pic(i)=buf(i*ixs)
2                    continue
           endif return
           end c----------------------------------------------------------- subroutine movxsi(n,ixs,pic,buf)

dimension pic(0:0),buf(0:0)

if(ixs.eq.1) then
                   do 1 i=0,n-1
                   buf(i)=pic(i)
1           continue
           else
c                    !put pic into sampled buf
                   do 2 i=0,n-1
                   buf(i*ixs)=pic(i)
2                    continue
           endif return
           end c----------------------------------------------------------- subroutine mulcy(n,c,y,z)

dimension y(0:0),z(0:0)

do 1 i=0,n-1
           z(i)=z(i)+c*y(i)
1            continue
c            !loop z return
           end c----------------------------------------------------------- subroutine clrx(n,data)

dimension data(0:0)

do 1 i=0,n-1
           data(i)=0.
1            continue
c            loop i return
           end c----------------------------------------------------------- subroutine dskdiv(iu1,iu2,lrec,buf,ne,nl,fdiv)
```

```
c       read a direct access file,
c       divide each pixel by fdiv and
c       write back dimension buf(0:0)

do 1 irec=1,nl
        read(iu1,rec=irec) (buf(i),i=0,ne-1)
           do 2 i=0,ne-1
           buf(i)=buf(i)/fdiv
2          continue
c       loop i
        write(iu2,rec=irec) (buf(i),i=0,ne-1)
1       continue
c       loop irec return
        end
```

C       SHARPENING AND NOISE SUPPRESSION BY SINGULAR VALUE DECOMPOSITION

C       SVD_MOVE.FOR  -- SVD WITH MOVING AVERAGE

C            link with svd_util.f

C       DEC-20-88

C       maximum svd block size : 40x40

Appendix G
Copyright 1988
Eastman Kodak Company

```
        dimension  bufi(0:1999,0:39)
        dimension  bufo(0:1999,0:39)
        dimension  a(0:39,0:39),u(0:39,0:39),v(0:39,0:39)
        dimension  wt(0:39)

dimension  fc(0:39),dfc(0:39),ratio(0:39)

data ir,iw/5,6/ data iui,iuo,iun/51,52,53/
        data iuw/61/
        data a,u,v/1600*0.,1600*0.,1600*0./
        data wt/40*0./
        data fc,dfc,ratio/40*0.,40*0.,40*0./
```

C       NBE: # of elements per block   (BLOCK SIZE)
C       NE: number of pixels per linbe (e.g. 500 pixels)
C       NL: number of linbes of the image
c       ixsmpl,iysmpl : sampling in x and y directions c       INPUT c       define image size : nc,ne,nl
        call picsiz (ir,iw,'I',nc,ne,nl)

c       define image record size
        call recsiz (ir,iw,ne,lform,lrec)

c       open input image file
        call ifile (ir,iw,iui,lform,lrec)

c       read noise data file
        call nfile (ir,iw,iun,nbe,ixsmpl,iysmpl,fc,dfc,ratio)

c       open output image file
        call ofile (ir,iw,iuo,lform,lrec)

c       get pre/post processing weights
        call wfile (ir,iw,iuw,modew,nbe,wt,sum)

write (iw,122)
122     format (' Starting IX0,IY0 ?')
        read (ir,*) ix0,iy0 c       block orientation mode = 0 (0 or 90 degree)
        modeb=0 write (iw,140)

```
140    format(' idx,idy: No. of pixels to be moved '
      1,'in X and Y directions'/)
       read (ir,*)idx,idy write (iw,151)
151    format (' Boost formula'
      3,/,' 6: THRESHOLD1 ,EXP(-A*X**4) AND FMIN,FMAX')

write (iw,152)
152    format (' Boost FORMULA(I) ?')
       read (ir,*) iform write (iw,162)
162    format (' THRSH1(R),POWER(R),FMIN,FMAX,COEFF(FOR 6:) ?')
       read (ir,*) thrsh1,power,fmin,fmax,coeff msize  = ixsmpl*(nbe-1)+1
       nbsize = ixsmpl*nbe
       nbsiz2 = ixsmpl*nbe/2
       nxmove = nbsize/idx
       nymove = nbsize/idy write (iw,202)nbe,ix0,iy0,ixsmpl,iysmpl
      1               ,msize,nbsize,idx,idy,nxmove,nymove if (modew.ne.0) then
          write (iw,204) modew,sum
       endif 202    format (' MAIN: NBE,IX0,IY0 = ',T30,3I8
      1,/,' MAIN: IXSMPL,IYSMPL = ',T30,2I8
      2,/,' MAIN: SUPPORT SIZE = ',T30,I8
      3,/,' MAIN: NBE*IXSMPL   = ',T30,I8
      4,/,' MAIN: IDX,IDY      = ',T30,2I8
      5,/,' MAIN: NX ,NY       = ',T30,2I8)
204    format (' MODEW, SUM OF WEIGHTS = ',I5,E15.5)

do 305, mj = 0,nymove-1
          jy0 = iy0+mj*idy
          do 305, mi = 0,nxmove-1
             jx0 = ix0+mi*idx
             mseq = mj*nxmove+mi
             call hui (nsvd,ir,iw,iui,iuo,nc,ne,nl,nbe,ixsmpl,iysmpl
      1              ,bufi,bufo,a,u,v,fc,dfc,ratio
      2              ,iform,thrsh1,coeff,power,fmin,fmax
      3              ,jx0,jy0,idx,idy,mseq,modew,wt,lrec)

if (mseq.eq.mseq/10*10) then
                write (iw,304) mi,mj
304             format (1X,' MAIN: BLOCK X,Y = ',2I5,' DONE')
             endif
305    continue
       write(iw,333)nsvd
333    format(1x,' *** total number of svd called : ',i10)
C      ALL THE SUM IS ACCUMULATED IN OUTPUT FILE
C      READ IT AND DIVIDE BY NXMOVE*NYMOVE denom = float(nxmove*nymove)
       if (modew.eq.1.or.modew.eq.2) then
          denom = (sum*sum*denom)/(nbe*nbe)
       endif call dskdiv (iuo,iuo,lrec,bufo,ne,nl,denom)

close (iui)
       close (iuo)

end c----------------------------------------------------------------------- subroutine hui(nsvd,ir,iw,iui,iuo,nc,ne,nl,nbe,ixsmpl,iysmpl
      1              ,bufi,bufo,a,u,v,fc,dfc,ratio
      2              ,iform,thrsh1,coeff,power,fmin,fmax
      3              ,jx0,jy0,idx,idy,mseq,modew,wt,lrec)
```

```
c       GIVEN JX0,JY0(STARTING POINT), IT WILL MAKE IXSMPL*IYSMPL
c       MOVES OF BLOCK TRANSFORM c       THIS SUBROUTINE DOES ALL THE ACTUAL PROCESSING.
c       MAIN PROGRAM JUST SETS UP ARRAY SIZES FOR A GIVEN PICTURE.

dimension   bufi(0:ne-1,0:nbe-1)
        dimension   bufo(0:ne-1,0:nbe-1)
        dimension   a(0:nbe-1,0:nbe-1)
        dimension   u(0:nbe-1,0:nbe-1),v(0:nbe-1,0:nbe-1)
        dimension   work(100)
        dimension   fc(0:39),dfc(0:39),ratio(0:39)
        dimension   id(0:39),sigma(0:39)
        dimension   wt(0:nbe-1)

n       = nbe
        m       = nbe
        nm      = nbe
        nbrxs   = nbe*ixsmpl nxtry   = (ne-jx0-nbe)/nbrxs-1
        nytry   = (nl-jy0-nbe)/nbrxs
        if (((nytry-1)*nbrxs+nbe).gt.nl) then
           nytry = nytry-1
        endif
        lextra = nl-nytry*nbrxs-jy0 if (mseq.eq.0) then
           write (iw,802) nbe,ixsmpl,iysmpl,
     1                    iform,thrshl,power,fmin,fmax,coeff
802     format (' HUI:nbe,ixsmpl,iysmpl=',3I5,/
     1          ,' boost formula, thrshl,power,fmin,fmax,coeff = '
     2          ,/,1x,I5,5E15.5)

endif c       skip jy0 lines
        if (jy0.ge.1)then
           do 840, iy = 0,jy0-1
           irec = iy+1
           read (iui,rec=irec) (bufi(i,0),i=0,ne-1)
           write (iuo,rec=irec) (bufi(i,0),i=0,ne-1)
840        continue
        endif c       processing the input image block by block do 910, iy = 0,nytry-1
           line1 = jy0+1+iy*nbrxs do 910, iys = 0,iysmpl-1
              line2 = line1+iys c       read in nbe lines from the input image into bufi do 850, j = 0,nbe-1
                 linei = line2+j*iysmpl
                 read (iui,rec=linei) (bufi(i,j),i=0,ne-1)

c       if it is a first path :
c                             initialize the output buffer  -- bufo
c            otherwise : read in output buffer              -- bufo
              if (mseq.eq.0) then
                 do 845, jj = 0,nbe-1
                 do 845, ii = 0,ne-1
                    bufo(ii,jj) = 0.
845              continue
              else if (mseq.ne.0) then
                 read (iuo,rec=linei) (bufo(i,j),i=0,ne-1)
              endif
850           continue c       set up array a(i,j)

do 900, ix = 0,nxtry-1
           ixoff1 = jx0+nbrxs*ix do 900, ixs = 0,ixsmpl-1
              ixoff2 = ixoff1+ixs+(nbe/2)*ixsmpl
```

```
              do 860, j = 0,nbe-1
              do 860, i = 0,nbe-1
              ii = ixoff2+i*ixsmpl
              a(i,j) = bufi(ii,j)
860           continue call svd (nm,m,n,a,sigma,.true.,u,.true.,v,ierr,work)
              nsvd=nsvd+1 if (ierr.ne.0) then
                write (iw,20) ix,iy,ierr
20              format (' TROUBLE. IX,IY,IERR= ',3I6)
                do 865, l = 0,nbe-1
                  write (iw,22) l,sigma(l)
22                format (1x,i3,'th singular value = ',E15.5)
865             continue
                do 866 i=0,ierr-1
                sigma(i)=0.
866             continue
              endif c     sort sigma(=singular values) in descending order call sort (nbe,sigma,id)
c
c     SIGMA(I,L(ID)): Ith SINGULAR VALUE c     COMPUTE NEW A(I,J) ACCORDING TO CORING FORMULAR(IFORM) FROM
c     SIGMA, U, AND V.

call newaij (ir,iw,nbe,id,a,sigma,u,v,fc,dfc,ratio
     1                    ,iform,thrshl,coeff,power,fmin,fmax)

if (modew.eq.-1) then
                do 885, j = 0,nbe-1
                do 885, i = 0,nbe-1
                  a(i,j) = a(i,j)/wt(i)/wt(j)
885             continue
              else if (modew.eq.1) then
                do 890, j = 0,nbe-1
                do 890, i = 0,nbe-1
                  a(i,j) = a(i,j)*wt(i)*wt(j)
890             continue
              endif

C     UPDATE OUTPUT BUFFER : BUFO do 895, j = 0,nbe-1
              jj = j
              do 895, i = 0,nbe-1
              ii = ixoff2+i*ixsmpl
              bufo(ii,jj) = bufo(ii,jj)+a(i,j)
895           continue 900     continue c     WRITE LINES OUT TO DISK (AFTER NN LINES, MM BLOCKS ARE PROCESSED)

do 905, j = 0,nbe-1
              lineo = line2+j*iysmpl
              write (iuo,rec=lineo) (bufo(i,j),i=0,ne-1)
905           continue 910     continue c     WRITE OUT REMAINING LINES if (lextra.gt.0) then
          line3 = nl-lextra+1
          do 915, iy = 0,lextra-1
            irec = line3+iy
            read (iui,rec=irec) (bufi(i,0),i=0,ne-1)
            write (iuo,rec=irec) (bufi(i,0),i=0,ne-1)
915       continue
        endif return
        end
```

```
c------------------------------------------------
      subroutine newaij (ir,iw,nbe,id,a,sigma,u,v,fc,dfc,ratio
     1,iform,thrshl,coeff,power,fmin,fmax)

logical first
      dimension a(0:nbe-1,0:nbe-1)
      dimension sigma(0:nbe-1),id(0:nbe-1)
      dimension u(0:nbe-1,0:nbe-1),v(0:nbe-1,0:nbe-1)
      dimension fc(0:39),dfc(0:39),ratio(0:39)

data first/.true./ if(first) then
         write (iw,8888) iform,thrshl,power,fmin,fmax,coeff
8888     format (' newaij: iform,t1,p,t2,c = ',i5,4f6.2)
         first=.false.
      endif do 100, j = 0,nbe-1
         do 100, i = 0,nbe-1
            a(i,j) = 0.
100   continue c     determine threshold formula if(iform.eq.6) then
         call iform6(ir,iw,nbe,id,a,sigma,u,v,fc,dfc,ratio
     1,iform,thrshl,coeff,power,fmin,fmax)
      endif return
      end
c------------------------------------------------
c     Boost formula 6 subroutine iform6 (ir,iw,nbe,id,a,sigma,u,v,fc,dfc,ratio
     1,iform,thrshl,coeff,power,fmin,fmax)

dimension a(0:nbe-1,0:nbe-1)
      dimension sigma(0:nbe-1),id(0:nbe-1)
      dimension u(0:nbe-1,0:nbe-1),v(0:nbe-1,0:nbe-1)
      dimension fc(0:39),dfc(0:39),ratio(0:39)

do 120, l = 0,nbe-1 c     depending on IFORM choose threshold level ff = 1.

if (sigma(l).ge.0.) then
            zz = (sigma(l)-fc(l))/dfc(l)

if (zz.le.thrshl) then
               ff = fmin
            else if (zz.gt.thrshl) then
               arg = coeff*((zz-thrshl)**power)
               if (arg.le.0.000000001) then
                  delf = delf*(1.+arg)
               else if (arg.gt.0.000000001.and.arg.le.10.) then
                  delf = delf*(1.-exp(-arg))
               else if (arg.gt.10.) then
                  delf = delf
               endif
c              end of arg ?

ff = fmin + delf
            endif
c           end of (zz...

else if(sigma(l).eq.0.) then
            ff=1.

else if (sigma(l).lt.0.) then
            write (iw,505) ix,iy,l,sigma(l)
505         format (' ix,iy,l,sigma(l)',3i5,e15.5)
            ff = 1.
```

```fortran
              endif
c             end of (sigma(1)...

do 110, j = 0,nbe-1
                do 110, i = 0,nbe-1
                  a(i,j) = a(i,j)+ff*sigma(l)*u(i,id(l))*v(j,id(l))
110           continue 120     continue
        return
        end c------------------------------------------------- subroutine nfile(ir,iw,iun,nbe,ixsmpl,iysmpl,fc,dfc,ratio)

character*32      text,fname dimension fc(0:nbe-1),dfc(0:nbe-1),ratio(0:nbe-1)

text='svd noise file for    0 degree'
        call ascnam(ir,iw,text,fname)
        call ascopn(iun,fname,'old',' ')

read(iun,*) nbe,ixsmpl,iysmpl write(iw,115) fname
115        format(' noise file:',a32,/
     1 5x,'order',5x,' mean',5x,'sigma',5x,'ratio')

do 802 l=0,nbe-1
        read(iun,*) iorder,fc(l),dfc(l),ratio(l)
        write(iw,116) iorder,fc(l),dfc(l),ratio(l)
116        format(1x,i5,3e15.5)
802        continue
c              end of loop l
        close(unit=iun)

return
        end
c       sml_filter.for
c       generate s,m and l low-pass filters              Appendix H
c       output filter file names : s.msk -- 3x3          Copyright 1988
c                                  m.msk -- 5x5          Eastman Kodak Company
c                                  l.msk -- 7x7 c       oct-26-87 character*32 fname(0:2)
        dimension s(0:8),ixsmpl(0:2),iysmpl(0:2)

data ir,iw/5,6/
        data iu,iu2/99,98/
        data s/1.,2.,1.,2.,4.,2.,1.,2.,1./
        data fname/'s.msk','m.msk','l.msk'/
        data ixsmpl/1,2,4/
        data iysmpl/1,2,4/ write(iw,10)
10      format(/,' : generates s.msk, m.msk and l.msk '
     1  ,'low pass filter files',/)

c       input sigmax=0.
        sigmay=0.
        nbe=3
        nbl=3 c       output do 90 l=0,2 open (unit=iu,file=fname(l))

write(iu,102) nbe,nbl,ixsmpl(l),iysmpl(l),sigmax,sigmay
```

```
102       format(1x,4i5,2e15.5)
          do 50 i=0,nbe*nbl-1
          write(iu,104) i,s(i)
104       format(1x,i5,e15.5)
50        continue
          close(iu)
90     continue end
c      SHARPENING AND NOISE SUPPRESSION BY SINGULAR VALUE DECOMPOSITION c      SVD_MOVE._3ORI.F  -- SVD WITH MOVING AVERAGE and 3 ORIENTATIONS c           link with svd_util.f                    Appendix I
c                                                   Copyright 1988
c      DEC-20-88                                    Eastman Kodak Company c      maximum svd block size : 40x40 c      WITH THREE MODES:0--STRAIGHT
c                       1--45 DEGREE SLANT
c                       2--135 DEGREE SLANT
c      MOVING BLOCK AVERAGE
c      WITH SAMPLING IXSMPL,IYSMPL
c      IX0,IY0,AND SCALE FACTOR FOR NOISE
c      MAXIMUM BLOCK SIZE 40x40 dimension  bufi(0:1999,0:39)
       dimension  bufo(0:1999,0:39)
       dimension  a(0:39,0:39),u(0:39,0:39),v(0:39,0:39)
       dimension  wt(0:39)

dimension  iun(0:2)
       dimension  fc(0:39,0:2),dfc(0:39,0:2),ratio(0:39,0:2)

data ir,iw/5,6/ data iui,iuo,iun/51,52,53,54,55/
       data iuw/61/
       data a,u,v/1600*0.,1600*0.,1600*0./
       data wt/40*0./
       data fc,dfc,ratio/120*0.,120*0.,120*0./ c      NBE: # of elements per block  (BLOCK SIZE)
c      NE: number of pixels per linbe (e.g. 400 pixels, or 1136 pixels)
c      NL: number of linbes of the image c      INPUT c      define image size : nc,ne,nl
       call picsiz (ir,iw,'I',nc,ne,nl)

c      define image record size
       call recsiz (ir,iw,ne,lform,lrec)

c      open input image file
       call ifile (ir,iw,iui,lform,lrec)

c      read noise data files
       call nfile (ir,iw,iun,nbe,ixsmpl,iysmpl,fc,dfc,ratio)

c      open output image file
       call ofile (ir,iw,iuo,lform,lrec)

c      get pre/post processing weights
       call wfile (ir,iw,iuw,modew,nbe,wt,sum)

write (iw,122)
122    format (' Starting IX0,IY0 ?')
       read (ir,*) ix0,iy0 write (iw,140)
140    format (' NBR: No. of pixels to be replaced in the block'
      1/' IDX,IDY: No. of pixels to be moved in X and Y directions'/)
```

```
            write (iw,142)
142         format (' NBR,IDX,IDY ?')
            read (ir,*) nbr,idx,idy c       get block orientation mode
            write (iw,171)
171         format (' Block selection mode:'
           1,/,'  0:    0 degree'
           1,/,'  1:   45 degree'
           1,/,'  2:  135 degree'
           1,/,'  3: best of the above three'
           1,/,' MODEB ?')
            read (ir,*) modeb write (iw,151)
151         format (' Boost formula'
           3,/,' 6: THRESHOLD1 ,EXP(-A*X**4) AND FMIN,FMAX')

write (iw,152)
152         format (' Boost FORMULA(I) ?')
            read (ir,*) iform write (iw,162)
162         format (' THRSH1(R),POWER(R),FMIN,FMAX,COEFF(FOR 6:) ?')
            read (ir,*) thrsh1,power,fmin,fmax,coeff msize  = ixsmpl*(nbe-1)+1
            nbsize = ixsmpl*nbe
            nbsiz2 = ixsmpl*nbe/2
            nxmove = nbsize/idx
            nymove = nbsize/idy write (iw,202) nbr,ix0,iy0,ixsmpl,iysmpl
           1              ,msize,nbsize,idx,idy,nxmove,nymove if (modew.ne.0) then
               write (iw,204) modew,sum
            endif 202         format (' MAIN: NBR,IX0,IY0 = ',T30,3I8
           1,/,' MAIN: IXSMPL,IYSMPL = ',T30,2I8
           1,/,' MAIN: SUPPORT SIZE = ',T30,I8
           1,/,' MAIN: NBE*IXSMPL = ',T30,I8
           1,/,' MAIN: IDX,IDY = ',T30,2I8
           2,/,' MAIN: NX ,NY = ',T30,2I8)
204         format (' MODEW, SUM OF WEIGHTS = ',I5,E15.5)

do 305, mj = 0,nymove-1
              jy0 = iy0+mj*idy
              do 305, mi = 0,nxmove-1
                jx0 = ix0+mi*idx
                mseq = mj*nxmove+mi
                call hui (nsvd,ir,iw,iui,iuo,nc,ne,nl,nbe,ixsmpl,iysmpl
           1             ,bufi,bufo,lp,a,u,v,fc,dfc,ratio
           2             ,iform,thrsh1,coeff,power,fmin,fmax
           3             ,jx0,jy0,idx,idy,mseq,nbr,modew,wt,lrec,modeb)

if (mseq.eq.mseq/10*10) then
                   write (iw,304) mi,mj
304                format (1X,' MAIN: BLOCK X,Y = ',2I5,' DONE')
                endif
305         continue write(iw,333)nsvd
333         format(1x,' *** total number of svd called : ',i10)
C       ALL THE SUM IS ACCUMULATED IN OUTPUT FILE
C       READ IT AND DIVIDE BY NXMOVE*NYMOVE denom = float(nxmove*nymove)
            if (modew.eq.1.or.modew.eq.2) then
               denom = (sum*sum*denom)/(nbe*nbe)
            endif call dskdiv (iuo,iuo,lrec,bufo,ne,nl,denom)

close (iui)
            close (iuo)
            end
```

```
c------------------------------------------------------------------
      subroutine hui(nsvd,ir,iw,iui,iuo,nc,ne,nl,nbe,ixsmpl,iysmpl
     1               ,bufi,bufo,lp,a,u,v,fc,dfc,ratio
     2               ,iform,thrshl,coeff,power,fmin,fmax
     3               ,jx0,jy0,idx,idy,mseq,nbr,modew,wt,lrec,modeb)

c     GIVEN JX0,JY0(STARTING POINT), IT WILL MAKE IXSMPL*IYSMPL
c     MOVES OF BLOCK TRANSFORM c     THIS SUBROUTINE DOES ALL THE ACTUAL PROCESSING.
c     MAIN PROGRAM JUST SETS UP ARRAY SIZES FOR A GIVEN PICTURE.

dimension  bufi(0:ne-1,0:nbe-1)
      dimension  bufo(0:ne-1,0:nbe-1)
      dimension  a(0:nbe-1,0:nbe-1)
      dimension  u(0:nbe-1,0:nbe-1),v(0:nbe-1,0:nbe-1)
      dimension  temps(0:39,0:2),tempu(0:39,0:39,0:2)
      dimension  tempv(0:39,0:39,0:2),idtemp(0:39,0:2)
      dimension  work(100)
      dimension  fc(0:39,0:2),dfc(0:39,0:2),ratio(0:39,0:2)
      dimension  id(0:39),sigma(0:39)
      dimension  wt(0:nbe-1)

n    = nbe
      m    = nbe
      nm   = nbe
      nbr2 = (nbe-nbr)/2
      nbr3 = nbr2+nbr
      nbrxs = nbr*ixsmpl nxtry = (ne-jx0-nbe)/nbrxs-1
      nytry = (nl-jy0-nbe)/nbrxs
      if (((nytry-1)*nbrxs+nbe).gt.nl) then
        nytry = nytry-1
      endif
      lextra = nl-nytry*nbrxs-jy0+nbr2 if (mseq.eq.0) then
        write (iw,802) modeb,nbe,nbr,ixsmpl,iysmpl,
     1                 iform,thrshl,power,fmin,fmax,coeff
802     format (' HUI: modeb,nbe,nbr,ixsmpl,iysmpl=',5i5,/
     1         ,' boost formula, thrshl,power,fmin,fmax,coeff = '
     2         ,/,1x,I5,5E15.5)
        write (iw,804) lrec,ir,iw,iui,iuo
804     format (' hui: lrec,ir,iw,iui,iuo = ',5i5)

endif c     skip jy0 lines
      if ((jy0+nbr2).ge.1)then
        do 840, iy = 0,jy0+nbr2-1
          irec = iy+1
          read (iui,rec=irec) (bufi(i,0),i=0,ne-1)
          write (iuo,rec=irec) (bufi(i,0),i=0,ne-1)
840     continue
      endif c     processing the input image block by block do 910, iy = 0,nytry-1
        line1 = jy0+1+iy*nbrxs do 910, iys = 0,iysmpl-1
          line2 = line1+iys c         read in nbe lines from the input image into bufi do 850, j = 0,nbe-1
            linei = line2+j*iysmpl
            read (iui,rec=linei) (bufi(i,j),i=0,ne-1)

c         if it is a first path :
c                        initialize the output buffer  -- bufo
c              otherwise : read in output buffer        -- bufo if (mseq.eq.0) then
```

```
              do 845, jj = 0,nbe-1
              do 845, ii = 0,ne-1
                bufo(ii,jj) = 0.
845         continue
            else if (mseq.ne.0) then
              read (iuo,rec=linei) (bufo(i,j),i=0,ne-1)
            endif
850       continue c     set up array a(i,j)

do 900, ix = 0,nxtry-1
            ixoff1 = jx0+nbrxs*ix do 900, ixs = 0,ixsmpl-1
              ixoff2 = ixoff1+ixs if (modeb.eq.3) then
                model1 = 0
                model2 = 2
              else
                model1 = modeb
                model2 = modeb
              endif do 875, mode = model1,model2 c       COMPUTE SVD FOR 3 MODES:
c         0 : STRAIGHT BLOCK
c         1 : 45 DEG SLANT
c         2 : 135 DEG SLANT if (mode.eq.0) ixoff3 = ixoff2+(nbe/2)*ixsmpl
                if (mode.eq.1) ixoff3 = ixoff2+nbe*ixsmpl
                if (mode.eq.2) ixoff3 = ixoff2
c
                if (mode.eq.0) then
                  do 860, j = 0,nbe-1
                  do 860, i = 0,nbe-1
                  ii = ixoff3+i*ixsmpl
                    a(i,j) = bufi(ii,j)
860               continue
                else if (mode.eq.1) then
                  do 861, j = 0,nbe-1
                  do 861, i = 0,nbe-1
                    ii = ixoff3+i*ixsmpl
                    a(i,j) = bufi(ii-j,j)
861               continue
                else if (mode.eq.2) then
                  do 862, j = 0,nbe-1
                  do 862, i = 0,nbe-1
                    ii = ixoff3+i*ixsmpl
                    a(i,j) = bufi(ii+j,j)
862               continue
                endif call svd (nm,m,n,a,sigma,.true.,u,.true.,v,ierr,work)
                nsvd=nsvd+1 if (ierr.ne.0) then
                  write (iw,20) ix,iy,ierr
20                format (' TROUBLE. IX,IY,IERR= ',3I6)
                  do 865, l = 0,nbe-1
                    write (iw,22) l,sigma(l)
22                  format (1x,i3,'th singular value = ',E15.5)
865               continue
                  do 866 i=0,ierr-1
                    sigma(i)=0.
866               continue
                endif c       sort sigma(=singular values) in descending order call sort (nbe,sigma,id)
```

```
              do 870, i = 0,nbe-1
                temps(i,mode) = sigma(i)
                idtemp(i,mode) = id(i)
 870          continue
              do 871, i = 0,nbe-1
                do 871, J = 0,NBE-1
                  tempv(i,j,mode) = v(i,j)
                  tempu(i,j,mode) = u(i,j)
 871          continue c
c       SIGMA(I,L(ID)): Ith SINGULAR VALUE 875          continue
              if (modeb.eq.0.or.modeb.eq.1.or.modeb.eq.2) then
                kmode = modeb
              else if (modeb.eq.3) then
                call bmode(iw,nbe,temps,fc,dfc,kmode)
              else
                write (iw,*) ' HUI:MODEB IS NOT RIGHT'
                stop
              endif do 880, i = 0,nbe-1
                sigma(i) = temps(i,kmode)
                id(i) = idtemp(i,kmode)
                do 880, j = 0,nbe-1
                  u(i,j) = tempu(i,j,kmode)
                  v(i,j) = tempv(i,j,kmode)
 880          continue c       COMPUTE NEW A(I,J) ACCORDING TO CORING FORMULAR(IFORM) FROM
c       SIGMA, U, AND V.

call newaij (ir,iw,nbe,id,a,sigma,u,v,fc,dfc,ratio
     1                    ,iform,thrshl,coeff,power,fmin,fmax,kmode)

if (modew.eq.-1) then
                do 885, j = 0,nbe-1
                do 885, i = 0,nbe-1
                  a(i,j) = a(i,j)/wt(i)/wt(j)
 885            continue
              else if (modew.eq.1) then
                do 890, j = 0,nbe-1
                do 890, i = 0,nbe-1
                  a(i,j) = a(i,j)*wt(i)*wt(j)
 890            continue
              endif c       UPDATE OUTPUT BUFFER : BUFO
c       REPLACE NBR LINES AND ELEMENTS.

c       NBR2 = (NBE-NBR)/2, NBR3=NBR2+NBR if(nbr.le.nbe/2) then
                ixoff4 = ixoff2+(nbe/2)*ixsmpl+nbr2*ixsmpl
                if (kmode.eq.0) then
                  do 895, j = 0,nbr-1
                    jj = nbr2+j
                    do 895, i = 0,nbr-1
                      ii = ixoff4+i*ixsmpl
                      bufo(ii,jj) = bufo(ii,jj)+a(nbr2+i,jj)
 895              continue
                else if (kmode.eq.1) then
                  do 896, j = 0,nbr-1
                    jj = nbr2+j
                    do 896, i = 0,nbr-1
                      ii = ixoff4+i*ixsmpl
                      bufo(ii,jj) = bufo(ii,jj)+a(nbe/2-nbr+i+j,jj)
 896              continue
                else if (kmode.eq.2) then
                  do 897, j = 0,nbr-1
                    jj = nbr2+j
                    do 897, i = 0,nbr-1
                      ii = ixoff4+i*ixsmpl
                      bufo(ii,jj) = bufo(ii,jj)+a(nbe/2+i-j,jj)
```

```
897     continue
          endif
c           end of kmode ?

else if(nbr.eq.nbe) then
          if (kmode.eq.0) then
            ixoff4=ixoff2+(nbe/2)*ixsmpl
            do 995, j = 0,nbr-1
            jj = nbr2+j
            do 995, i = 0,nbr-1
            ii = ixoff4+i*ixsmpl
              bufo(ii,jj) = bufo(ii,jj)+a(i,j)
995       continue
          else if (kmode.eq.1) then
            ixoff4=ixoff2+nbe*ixsmpl
            do 996, j = 0,nbr-1
            jj = nbr2+j
            do 996, i = 0,nbr-1
            ii = ixoff4+i*ixsmpl
              bufo(ii-j,jj) = bufo(ii-j,jj)+a(i,j)
996       continue
          else if (kmode.eq.2) then
            ixoff4=ixoff2
            do 997, j = 0,nbr-1
            jj = nbr2+j
            do 997, i = 0,nbr-1
            ii = ixoff4+i*ixsmpl
              bufo(ii+j,jj) = bufo(ii+j,jj)+a(i,j)
997       continue
          endif
c           end of kmode ?
        else
        write(iw,*) ' nbr should be .le.(nbe/2).or .eq.nbe'
        stop
        endif
c         end of nbr ?

900     continue c       WRITE LINES OUT TO DISK (AFTER NN LINES, MM BLOCKS ARE PROCESSED)

do 905, j = nbr2,nbr3-1
          lineo = line2+j*iysmpl
          write (iuo,rec=lineo) (bufo(i,j),i=0,ne-1)
905     continue 910     continue c       WRITE OUT REMAINING LINES if (lextra.gt.0) then
          line3 = nl-lextra+1
          do 915, iy = 0,lextra-1
            irec = line3+iy
            read (iui,rec=irec) (bufi(i,0),i=0,ne-1)
            write (iuo,rec=irec) (bufi(i,0),i=0,ne-1)
915       continue
        endif return
        end c------------------------------------------------------- subroutine newaij (ir,iw,nbe,id,a,sigma,u,v,fc,dfc,ratio
     1,iform,thrshl,coeff,power,fmin,fmax,kmode)

logical first
        dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39,0:2),dfc(0:39,0:2),ratio(0:39,0:2)

data first/.true./ if(first) then
```

```
            write (iw,8888) iform,thrsh1,power,fmin,fmax,coeff,kmode
8888        format (' newaij: iform,t1,p,t2,c,kmode = ',i5,4f6.2,i5)
            first=.false.
          endif do 100, j = 0,nbe-1
          do 100, i = 0,nbe-1
            a(i,j) = 0.
100     continue if(iform.eq.6) then
          call iform6(ir,iw,nbe,id,a,sigma,u,v,fc,dfc,ratio
     1,iform,thrsh1,coeff,power,fmin,fmax,kmode)
        endif return
        end
c----------------------------------------------------------------
        subroutine iform6 (ir,iw,nbe,id,a,sigma,u,v,fc,dfc,ratio
     1,iform,thrsh1,coeff,power,fmin,fmax,kmode)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39,0:2),dfc(0:39,0:2),ratio(0:39,0:2)

delf = fmax - fmin do 120, l = 0,nbe-1 c       depending on IFORM choose boost level ff = 1.

if (sigma(l).gt.0.) then
          zz = (sigma(l)-fc(l,kmode))/dfc(l,kmode)

if (zz.le.thrsh1) then
            ff = fmin
          else if (zz.gt.thrsh1) then
            arg = coeff*((zz-thrsh1)**power)
            if (arg.le.0.000000001) then
              delf = delf*(1.-arg)
            else if (arg.gt.0.000000001.and.arg.le.10.) then
              delf = delf*exp(-arg)
            else if (arg.gt.10.) then
              delf = delf
            endif
c           end of arg ?

ff = fmin + delf
          endif
c           end of (zz...

else if(sigma(l).eq.0.) then
        ff=1.

else if (sigma(l).lt.0.) then
          write (iw,505) ix,iy,l,sigma(l)
505       format (' ix,iy,l,sigma(l)',3i5,e15.5)
          ff = 1.
        endif
c       end of (sigma(l)...

do 110, j = 0,nbe-1
          do 110, i = 0,nbe-1
            a(i,j) = a(i,j)+ff*sigma(l)*u(i,id(l))*v(j,id(l))
110     continue
120     continue
        return
        end c----------------------------------------------------------------
        subroutine bmode (iw,nbe,temps,fc,dfc,kmode)
```

```
C       SELECT THE MODE WHICH IS THE BEST dimension temps(0:39,0:2)
        dimension fc(0:39,0:2),dfc(0:39,0:2)
        dimension lzero(0:2),modeid(0:2)
        dimension zval(0:2)

C       GET THE ORDER WHICH IS CLOSE TO NOISE VALUE do 110, mode = 0,2
          lzero(mode) = 0
          do 100, l = 0,nbe-1
            zz = (temps(l,mode)-fc(l,mode))/dfc(l,mode)
            if (abs(zz).lt.3.5) then
              lzero(mode) = l
              go to 110
            endif
100       continue
110     continue C       DETERMINE THE MODE WHICH HAS THE LOWEST ORDER
C       SEE IF ANY OF THE TWO ARE THE SAME lmin = nbe-1
        do 120, mode = 0,2
          if (lzero(mode).le.lmin) then
            lmin = lzero(mode)
          endif
120     continue lflag = 0
        do 130, mode = 0,2
          if (lzero(mode).eq.lmin) then
            modeid(lflag) = mode
            lflag = lflag+1
          endif
130     continue if (lflag.eq.1) then
          kmode = modeid(0)

else if (lflag.eq.2) then
          call clrx(2,zval)
          do 140, k = 0,1
            kk = modeid(k)
            do 140, i = 0,1
              zval(k) = zval(k)+(temps(i,kk)-fc(i,kk))/dfc(i,kk)
140       continue kmode = modeid(0)
          if (zval(1).gt.zval(0)) kmode = modeid(1)

else if (lflag.eq.3) then if (modeid(0).eq.0) then
            kmode = 0 else if (modeid(0).eq.1) then
            zmax = -999.
            kmode = -1
            do 150, k = 0,2
              zz = (temps(0,k)-fc(0,k))/dfc(0,k)
              if (zz.gt.zmax) then
                kmode = k
              endif
150         continue else
            call clrx(3,zval)
            do 160, k = 0,2
              do 160, l = 0,1
                zval(k) = zval(k)+(temps(l,k)-fc(l,k))/dfc(l,k)
160         continue zmax = -999.
            kmode = -1
            do 165, k = 0,2
```

```
              if (zval(k).gt.zmax) then
                 kmode = k
              endif
165        continue endif if (kmode.eq.-1) then
            write (iw,170) (zval(k),k = 0,2)
170         format (' WARNING !!! BMODE: LFLAG = 3, ZVAL =',3F10.2)
            kmode = 0
         endif endif return
      end c------------------------------------------------- subroutine norm(ne,nl,buf,denom)

dimension buf(0:ne-1,0:nl-1)

do 1 j=0,nl-1
      do 1 i=0,ne-1
      buf(i,j)=buf(i,j)/denom
1     continue return
      end
c------------------------------------------------- subroutine nfile(ir,iw,iun,nbe,ixsmpl,iysmpl,fc,dfc,ratio)

character*32     text,fname(0:2)

dimension fc(0:nbe-1,0:2),dfc(0:nbe-1,0:2),ratio(0:nbe-1,0:2)
      dimension iun(0:2)
c        dimension mode(0:2)

text='svd noise file for   0 degree'
      call ascnam(ir,iw,text,fname(0))
      call ascopn(iun(0),fname(0),'old',' ')

text='svd noise file for  45 degree'
      call ascnam(ir,iw,text,fname(1))
      call ascopn(iun(1),fname(1),'old',' ')

text='svd noise file for 135 degree'
      call ascnam(ir,iw,text,fname(2))
      call ascopn(iun(2),fname(2),'old',' ')

do 801 ifile=0,2
      read(iun(ifile),*) nbe,ixsmpl,iysmpl
c114        format(3i)
      write(iw,115) fname(ifile)
115        format(' noise file:',a32,/
     1 5x,'order',5x,' mean',10x,'sigma',5x,'ratio')

do 802 l=0,nbe-1
      read(iun(ifile),*) iorder
     1,fc(l,ifile),dfc(l,ifile),ratio(l,ifile)
      write(iw,116) iorder,fc(l,ifile),dfc(l,ifile),ratio(l,ifile)
116        format(1x,i5,3e15.5)
802        continue
c             end of loop l
      close(unit=iun(ifile))

801        continue
c     end of loop ifile return
      end
```

We claim:

1. A method of processing an image in a digital computer for sharpening the image, comprising the steps of:
   (a) generating a non-linear gain function based upon the measured statistics of the SVD singular values for image noise, said non-linear gain function being characterized by boosting factors applicable wherever there is a high signal-to-nose ratio;
   (b) filtering the digital image to produce a detail image and a low pass filtered image;
   (c) dividing the detail image into blocks;
   (d) transforming the blocks employing an SVD transformation to produce singular vectors and arrays of singular values;
   (e) applying the non-linear gain function to the arrays of singular values to produce arrays of modified singular values whereby to boost those singular values corresponding to a higher signal-to-noise ratio;
   (f) performing an inverse SVD on the singular vectors with modified singular values to produce blocks of processed detail image values; and
   (g) combining the processed image detail values with the low pass filtered image values to produce a sharpened digital image.

2. The method of processing a digital image claimed in claim 1, wherein said step of generating a non-linear gain function comprises the steps of:
   (1) producing a noise digital image having only a noise component;
   (2) filtering the noise digital image to produce a noise detail image and a low pass filtered noise image;
   (3) dividing the noise detail image into a plurality of blocks;
   (4) performing an SVD transformation on the blocks of the noise detail image to produce singular vectors and an array of singular values for each block;
   (5) calculating the means and standard deviations for respective singular values of the blocks; and
   (6) generating a non-linear gain function for each of the singular values based upon the respective means and standard deviations.

3. The method of processing a digital image claimed in claim 1, further including the steps of:
   (h) operating the method in a plurality of stages, wherein each stage employs blocks overlapping with blocks of another stage; and
   (i) generating the processed digital image from the average values of the processed image values from the overlapping blocks, whereby the processed image is generated without visible block structure.

4. The method of processing a digital image claimed in claim 1, further including the steps of;
   (h) operating the method in a stage, wherein said stage employs an image detail signal representing a certain pass band of spatial frequencies, and (b) generating the process digital image from the processed detail signal from said stage, whereby noise from different sources characterized by certain spatial frequency content is effectively removed from the image.

5. The method of processing a digital image claimed in claim 4, further including the steps of:
   (j) operating the method in a plurality of stages, wherein each stage employs blocks overlapping with blocks of another stage; and
   (k) generating the processed digital image from the average values of the processed image values from the overlapping blocks, whereby the processed image is generated without a visible block-like structure.

6. The method of processing a digital image claimed in claim 1, further including the steps of:
   (h) dividing the detail image into blocks having diagonally oriented edges;
   (i) performing the SVD transform on the diagonally oriented blocks; and
   (j) employing the blocks having the highest singular values for processing the image.

7. The method of processing a digital image claimed in claim 1, wherein the digital image is a color digital image, and wherein the method is applied to each color component of the digital image to produce a processed color digital image.

8. The method of processing a digital image claimed in claim 1, wherein the image is a color digital image having a luminance component and two color components, wherein the method is applied to the luminance component of the digital image to produce a processed color digital image.

* * * * *